US011861921B2

(12) United States Patent
Ohara et al.

(10) Patent No.: US 11,861,921 B2
(45) Date of Patent: Jan. 2, 2024

(54) MICROSCOPE SYSTEM

(71) Applicant: Evident Corporation, Nagano (JP)

(72) Inventors: Yuta Ohara, Tokyo (JP); Toshiyuki Hattori, Tokyo (JP); Masayoshi Karasawa, Tokyo (JP)

(73) Assignee: Evident Corporation, Nagano (JP)

( * ) Notice: Subject to any disclaimer, the term of this patent is extended or adjusted under 35 U.S.C. 154(b) by 387 days.

(21) Appl. No.: 17/357,357

(22) Filed: Jun. 24, 2021

(65) Prior Publication Data

US 2021/0319208 A1 Oct. 14, 2021

Related U.S. Application Data

(63) Continuation of application No. PCT/JP2019/051101, filed on Dec. 26, 2019.

(30) Foreign Application Priority Data

Dec. 28, 2018 (JP) .................... 2018-247359

(51) Int. Cl.
 *G06V 20/69* (2022.01)
 *G06T 7/00* (2017.01)
 (Continued)

(52) U.S. Cl.
 CPC ....... *G06V 20/693* (2022.01); *G02B 21/0088* (2013.01); *G02B 21/086* (2013.01);
 (Continued)

(58) Field of Classification Search
 CPC .............. G06V 20/693; G02B 21/0088; G02B 21/086; G06T 7/0012; G06T 2207/10056;
 (Continued)

(56) References Cited

U.S. PATENT DOCUMENTS 10,422,737 B2 * 9/2019 Demirci ............ B01L 3/502753
10,628,944 B2 * 4/2020 Hamamah ............ G06T 7/0014
(Continued)

FOREIGN PATENT DOCUMENTS

CN 103389369 A 11/2013
JP H0829694 A 2/1996
(Continued)

OTHER PUBLICATIONS

Chung, Lung-Yuan, et al. "In vitro dynamic fertilization by using EWOD device." 2015 28th IEEE International Conference on Micro Electro Mechanical Systems (MEMS). IEEE, 2015.*
(Continued)

*Primary Examiner* — Shefali D Goradia
(74) *Attorney, Agent, or Firm* — Holtz, Holtz & Volek PC

(57) ABSTRACT

An inverted microscope system provided with a transillumination subsystem that illuminates a sample includes: an eyepiece lens; an objective; a tube lens; a projection device, disposed below the objective, that projects a projected image based on projected image data onto an image plane where an optical image is formed; a first modulation element included in the transillumination subsystem; a second modulation element disposed between the objective and the tube lens; and a processor and a memory, the processor being configured to perform the following steps: generating an analysis result that specifies a candidate cell that is a reproductive cell suitable for fertilization, based on at least the digital image data acquired by the imaging device; and generating the projected image data based on the generated analysis result, wherein the projected image includes a first assisting image that specifies the candidate cell as an assisting image that assists with micro-insemination.

16 Claims, 28 Drawing Sheets

(51) Int. Cl.
  *G02B 21/00* (2006.01)
  *G02B 21/08* (2006.01)
(52) U.S. Cl.
  CPC .. *G06T 7/0012* (2013.01); *G06T 2207/10056* (2013.01); *G06T 2207/20081* (2013.01); *G06T 2207/20084* (2013.01); *G06T 2207/30024* (2013.01)
(58) Field of Classification Search
  CPC . G06T 2207/20081; G06T 2207/20084; G06T 2207/30024
  See application file for complete search history.

(56) References Cited

U.S. PATENT DOCUMENTS

| | | | |
|---|---|---|---|
| 10,866,397 B2 * | 12/2020 | Chu | G02B 21/14 |
| 2012/0120302 A1 | 5/2012 | Kiyota et al. | |
| 2014/0049815 A1 | 2/2014 | Kusaka | |
| 2014/0106389 A1 | 4/2014 | Loewke et al. | |
| 2014/0247972 A1 | 9/2014 | Wang et al. | |
| 2014/0293411 A1 | 10/2014 | Kaneki et al. | |
| 2018/0330510 A1 | 11/2018 | Watanabe | |
| 2019/0272641 A1 | 9/2019 | Akama et al. | |
| 2021/0191101 A1 | 6/2021 | Kabeya et al. | |
| 2021/0192179 A1 | 6/2021 | Nakata et al. | |
| 2021/0192181 A1 | 6/2021 | Yoneyama et al. | |
| 2021/0215923 A1 | 7/2021 | Nakata et al. | |

FOREIGN PATENT DOCUMENTS

| | | |
|---|---|---|
| JP | 2011004638 A | 1/2011 |
| JP | 2014504849 A | 2/2014 |
| JP | 2016509845 A | 4/2016 |
| JP | 2017092730 A | 5/2017 |
| JP | 6192335 B2 | 9/2017 |
| JP | 2018022216 A | 2/2018 |
| JP | 6076042 B2 | 6/2021 |
| JP | 6150586 B2 | 6/2021 |
| WO | WO-2010021392 A1 * | 2/2010 ........... C12Q 1/6883 |
| WO | 2010128670 A1 | 11/2010 |
| WO | 2012150689 A1 | 11/2012 |
| WO | 2018042413 A1 | 3/2018 |
| WO | WO-2019008569 A1 * | 1/2019 ......... G01N 15/1434 |
| WO | WO-2020059522 A1 * | 3/2020 |

OTHER PUBLICATIONS

Ferraz, Marcia AMM, et al. "Designing 3-dimensional in vitro oviduct culture systems to study mammalian fertilization and embryo production." Annals of Biomedical Engineering 45 (2017): 1731-1744.*
International Search Report (ISR) (and English translation thereof) dated Mar. 24, 2020 issued in International Application No. PCT/JP2019/051101.
Japanese Office Action dated Jun. 28, 2022 (and English translation thereof) issued in Japanese Application No. 2020-562401.
Extended European Search Report (EESR) dated Aug. 22, 2022, issued in counterpart European Application No. 19906490.8.
"Inverted Research Microscope Eclipse Ti", Nikon, Apr. 10, 2009, XP055950152, URL: http://samwoosc.co.kr/pdf/Nikon/Ti_e_3.pdf.
"IX83/IX73/IX53 Product Brochure", Olympus, Nov. 4, 2016, XP055950342, URL: https://dobrexmed.com/download/Olympus%20microscopes%20IX83_IX73_IX53.pdf.
Chen, et al., "Microscope 2.0: An Augmented Reality Microscope with Real-time Artificial Intelligence Integration", arxiv.org, Nov. 21, 2018, XP081662644, DOI: 10.1038/S41591-019-0539-7.
Dai, et al., "Automated Non-Invasive Measurement of Sperm Motility and Morphology Parameters", 2018 IEEE International Conference on Robotics and Automation (ICRA), May 21-25, 2018.
Gallagher, et al., "CASA: Tracking the Past and Plotting the Future", Reproduction, Fertility and Development, vol. 30, No. 6, Jan. 1, 2018, p. 867, XP055950001, ISSN: 1031-3613, DOI: 10.1071/RD17420, URL: https://www.publish.csiro.au/rd/pdf/RD17420.
Chinese Office Action dated Sep. 16, 2022, issued in counterpart Chinese Application No. 201980087302.8.

* cited by examiner

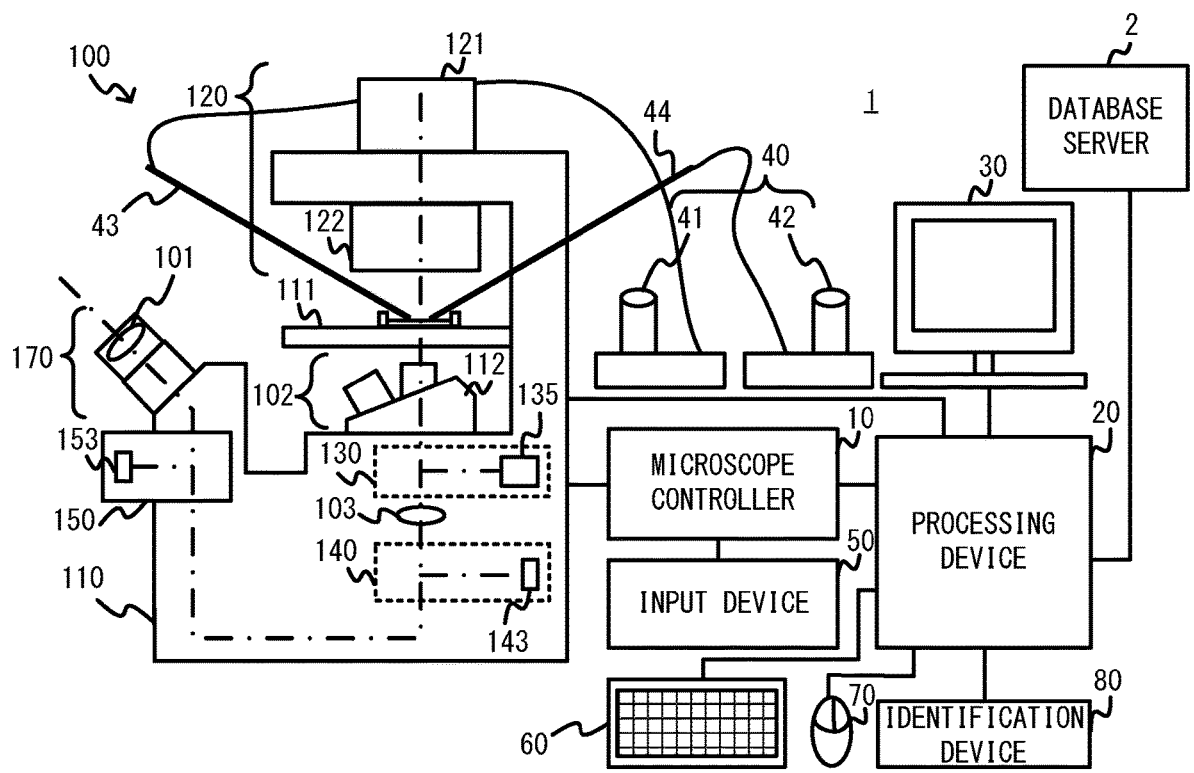
F I G. 1

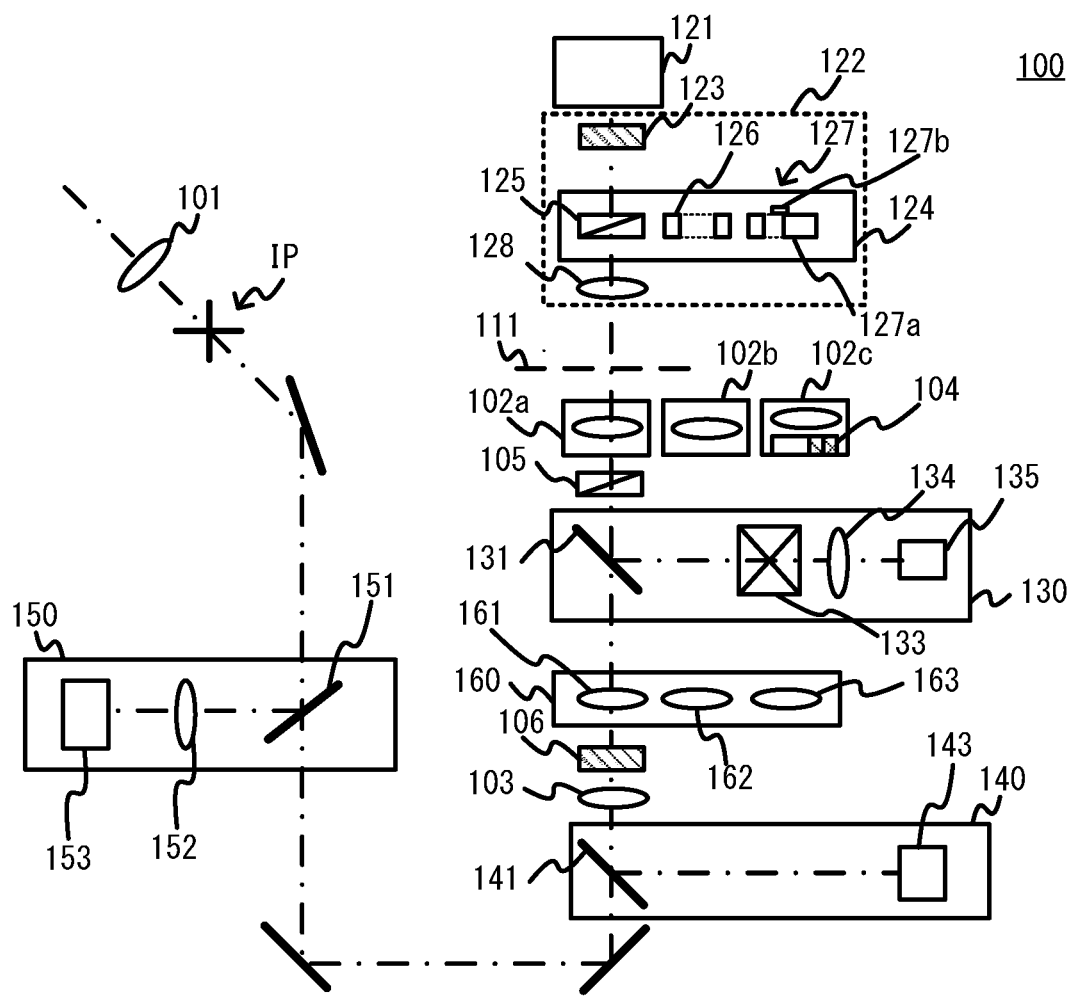
F I G. 2

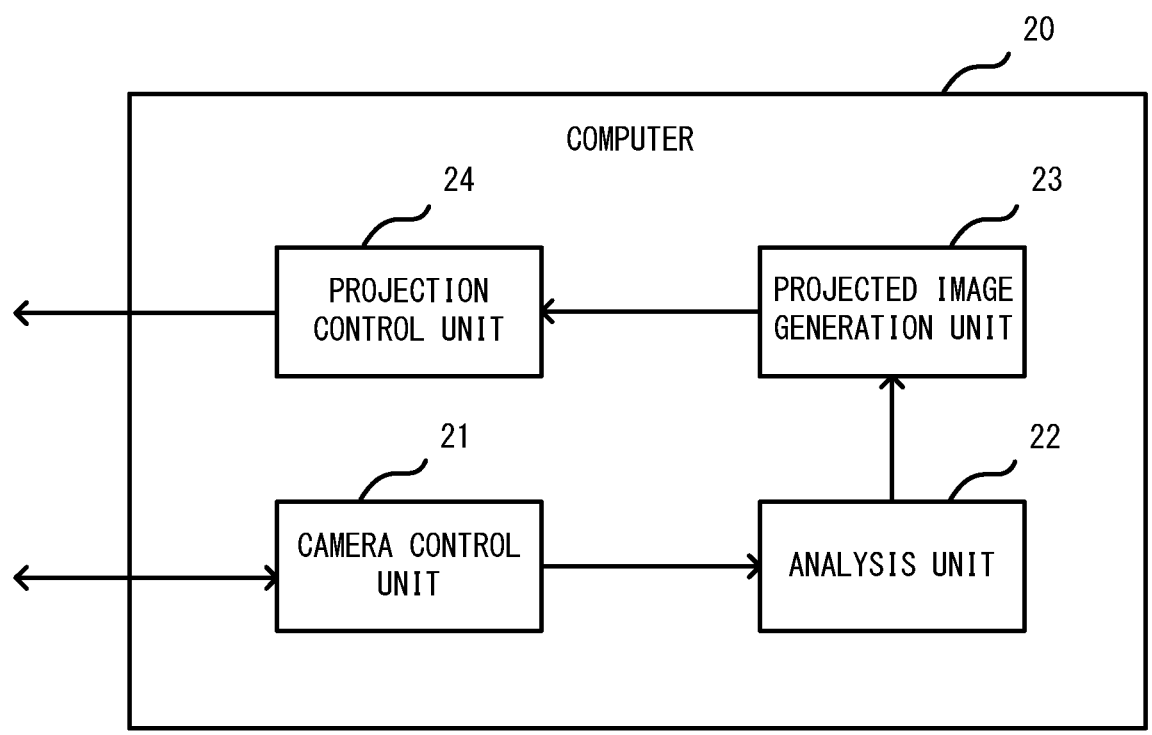
F I G. 4

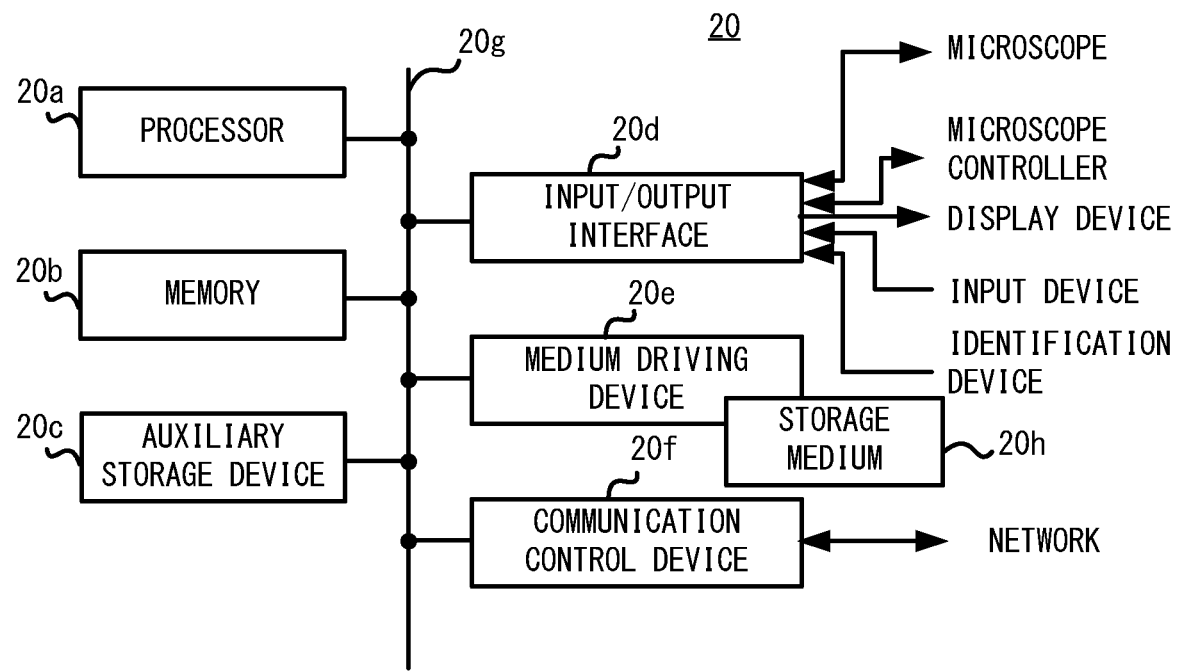
F I G. 5

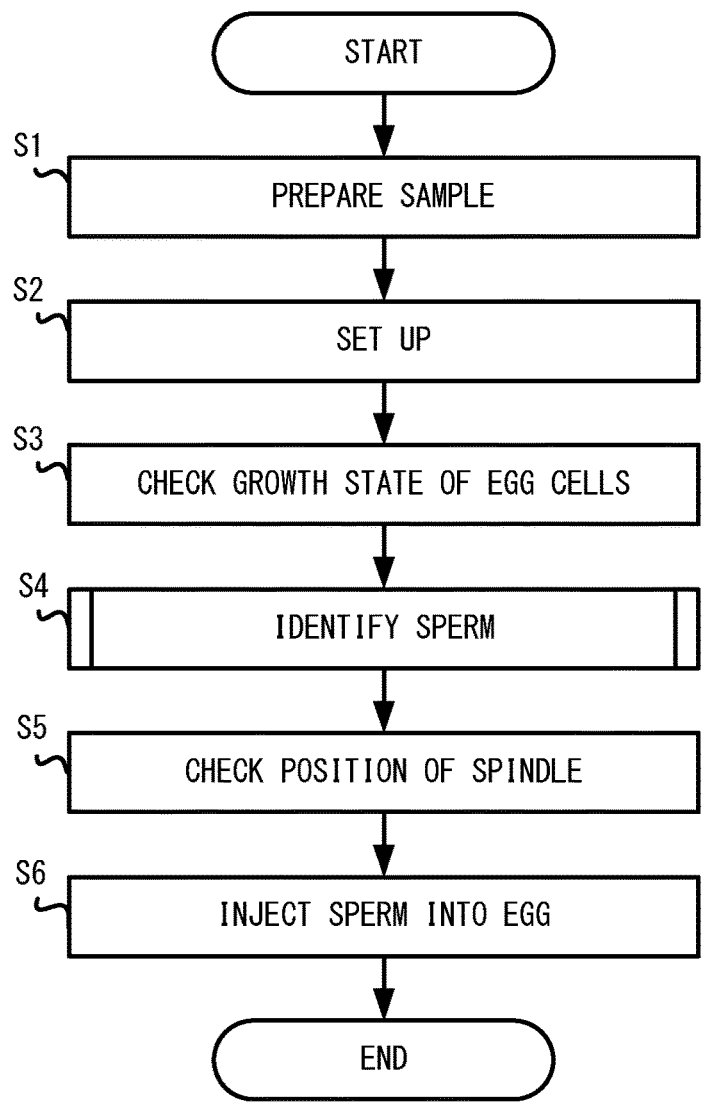
F I G. 6

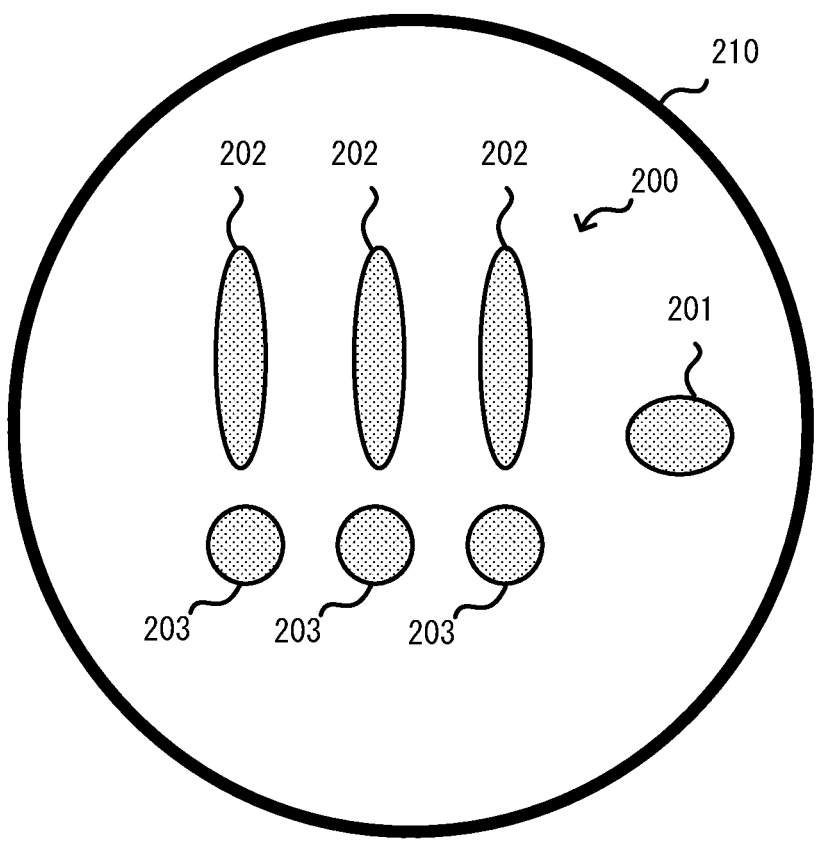
F I G. 7

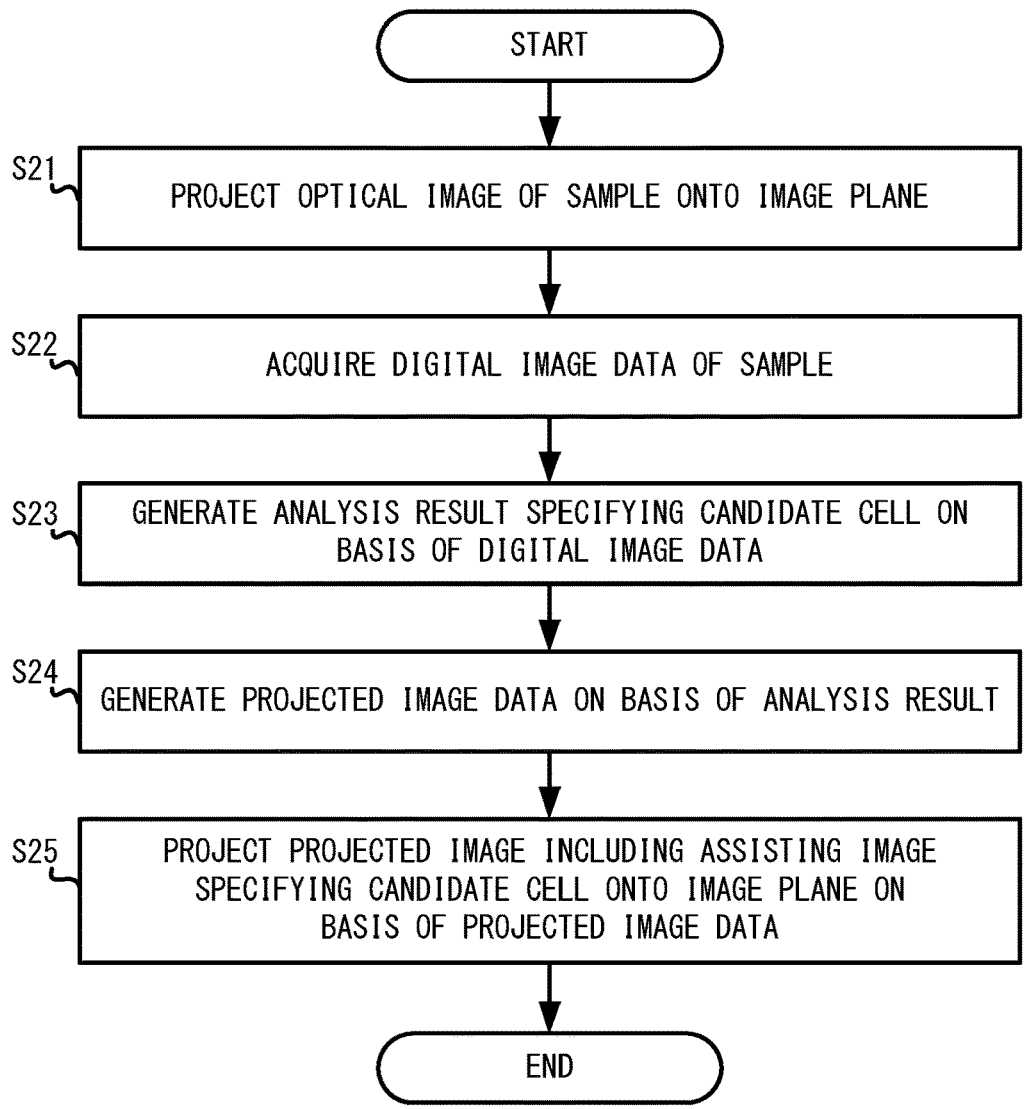
F I G. 9

MICROSCOPE SYSTEM

CROSS REFERENCE TO RELATED APPLICATIONS

This application is based upon and claims the benefit of priority of the prior Japanese Patent Application No. 2018-247359, filed Dec. 28, 2018, the entire contents of which are incorporated herein by reference.

This is a Continuation Application of PCT Application No. PCT/JP2019/051101, filed Dec. 26, 2019, which was not published under PCT Article 21(2) in English.

BACKGROUND

Micro-insemination is known as one market for inverted microscopes. Micro-insemination is a type of in vitro fertilization, and is a method of fertilizing an egg with sperm under a microscope. In general, micro-insemination is performed by intracytoplasmic sperm injection (ICSI), in which an egg held in place with a holding pipette is pierced by an injection pipette containing sperm to thereby inject the sperm directly inside the egg.

Technology related to such micro-insemination is described in International Publication No. WO 2012/150689, for example. International Publication No. WO 2012/150689 describes an observation apparatus that observes micro-insemination by switching between a polarized observation method, a differential interference contrast observation method, and a relief contrast observation method.

SUMMARY

The disclosure of this specification relates to a microscope system.

A microscope system according to one aspect of the present invention is an inverted microscope system provided with a transillumination subsystem that illuminates a sample, and includes: an eyepiece lens; an objective that guides transmitted light transmitted through the sample to the eyepiece lens; a tube lens, disposed between the eyepiece lens and the objective, that forms an optical image of the sample on a basis of the transmitted light; an imaging device that acquires digital image data of the sample on a basis of the transmitted light; a projection device, disposed below the objective, that projects a projected image on a basis of projected image data onto an image plane where the optical image is formed; a first modulation element, included in the transillumination subsystem, that modulates illuminating light irradiating the sample; a second modulation element, disposed between the objective and the tube lens, that modulates the transmitted light; and a processor and a memory, the processor being configured to perform the following steps: generating an analysis result that specifies a candidate cell, that is, a reproductive cell suitable for fertilization from among reproductive cells included in the sample, on a basis of at least the digital image data acquired by the imaging device; and generating the projected image data on a basis of the generated analysis result, wherein the projected image includes a first assisting image that specifies the candidate cell as an assisting image that assists with micro-insemination using the sample.

BRIEF DESCRIPTION OF THE DRAWINGS

The present invention will be more apparent from the following detailed description when the accompanying drawings are referenced.

FIG. 1 is a diagram illustrating an example of a configuration of a microscope system 1 according to a first embodiment.

FIG. 2 is a diagram illustrating an example of a configuration of an inverted microscope 100.

FIG. 4 is a diagram illustrating an example of a functional configuration of a processing device 20.

FIG. 5 is a diagram illustrating an example of a hardware configuration of the processing device 20.

FIG. 6 is a flowchart illustrating an example of an ICSI procedure.

FIG. 7 is a diagram illustrating an example of a configuration of a drop formed as a sample 200 inside a Petri dish 210.

FIG. 9 is a flowchart of an image projection process performed by the microscope system 1.

DETAILED DESCRIPTION

To raise the success rate of ICSI, it is important to select and inject sperm favorable for fertilization into the egg. However, determining whether the sperm obtained by selection work is favorable or not largely depends on the experience of the embryologist acting as the worker, and disparities in fertilization success rates are likely to occur among embryologists.

Hereinafter, embodiments of the present invention will be described in light of the above.

First Embodiment

Figure 3:
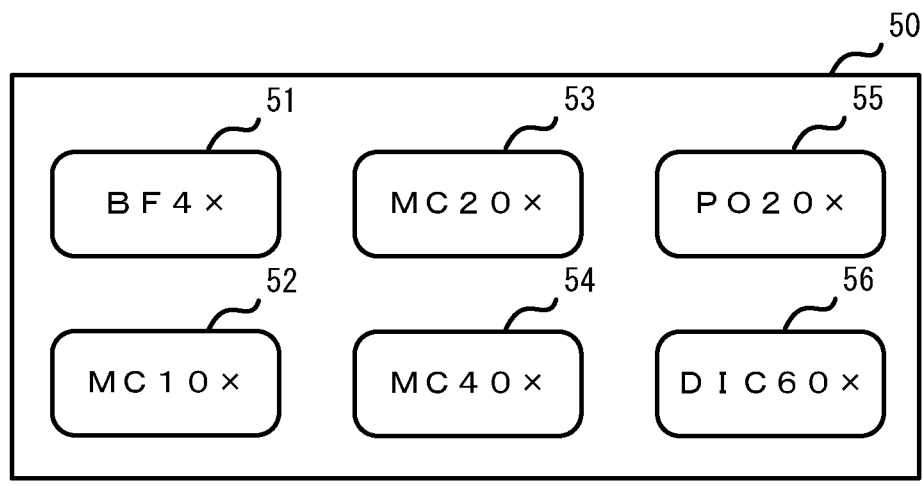
FIG. 3 is a diagram illustrating an example of a configuration of an operation unit of an input device 50.

FIG. 1 is a diagram illustrating an example of a configuration of a microscope system 1 according to the present embodiment. FIG. 2 is a diagram illustrating an example of a configuration of an inverted microscope 100. FIG. 3 is a diagram illustrating an example of a configuration of an operation unit of an input device 50. FIG. 4 is a diagram illustrating an example of a functional configuration of a processing device 20. FIG. 5 is a diagram illustrating an example of a hardware configuration of the processing device 20. The microscope system 1 illustrated in FIG. 1 is an inverted microscope system provided with a transillumination subsystem 120 used for micro-insemination, and is used by an embryologist who performs micro-insemination, for example.

The microscope system 1 is provided with at least an eyepiece lens 101, objectives 102, a tube lens 103, an imaging unit 140, a processing device 20, and a projection device 153. Furthermore, in the microscope system 1, a modulation element for visualizing an unstained sample used in micro-insemination is provided in each of an illumination optical path and an observation optical path.

The microscope system 1 uses the projection device 153 to project a projected image onto an image plane where an optical image of the sample is formed by one of the objectives 102 and the tube lens 103. With this arrangement, a user of the microscope system 1 sees an image in which the projected image is superimposed onto the optical image. In particular, by including an assisting image that assists with micro-insemination in the projected image, the microscope system 1 is capable of providing various information that assists with micro-insemination superimposed onto the optical image to the user who observes a sample by peering into the eyepiece lens 101 to perform the micro-insemination work.

Hereinafter, a specific example of the configuration of the microscope system 1 will be described in detail with reference to FIGS. 1 to 4. As illustrated in FIG. 1, the microscope system 1 is provided with an inverted microscope 100, a microscope controller 10, a processing device 20, a display device 30, a plurality of input devices (input device 40, input device 50, input device 60, input device 70), and an identification device 80. Furthermore, the microscope system 1 is connected to a database server 2 where various data is stored.

As illustrated in FIG. 1, the inverted microscope 100 is provided with a microscope body 110, in addition to a plurality of objectives 102, a stage 111, a transillumination subsystem 120, and an eyepiece tube 170, which are attached to the microscope body 110. The user is able to use the inverted microscope 100 to observe a sample according to the four microscopy methods of bright field (BF) observation, polarized (PO) observation, differential interference contrast (DIC) observation, and modulation contrast (MC) observation. Note that modulation contrast observation is also referred to as relief contrast (RC) observation.

The plurality of objectives 102 are mounted onto a revolving nosepiece 112. As illustrated in FIG. 2, the plurality of objectives 102 include an objective 102a used for BF observation, an objective 102b used for PO observation and DIC observation, and an objective 102c used for MC observation. Additionally, the objective 102c includes a modulator 104. The modulator 104 has three zones with different degrees of transmittance (for example, a zone with approximately 100% transmittance, a zone with approximately 5% transmittance, and a zone with approximately 0% transmittance).

In FIG. 2, three objectives corresponding to different microscopy methods are illustrated as an example, but the plurality of objectives 102 may also include a plurality of objectives with different magnifications for each microscopy method. Hereinafter, a case where a 4× objective used for BF observation, 10×, 20×, and 40× objectives used for MC observation, a 20× objective used for PO observation, and a 60× objective used for DIC observation are included will be described as an example.

The revolving nosepiece 112 is a switching device that switches the objective disposed on the optical path from among the plurality of objectives 102. The revolving nosepiece 112 switches the objective disposed on the optical path according to the microscopy method and the observation magnification. The objective disposed on the optical path by the revolving nosepiece 112 guides transmitted light that has transmitted through a sample to the eyepiece lens 101.

A sample inserted into a container is placed on the stage 111. The container is a Petri dish and the sample includes reproductive cells, for example. The stage 111 moves in the optical axis direction of the objective 102 disposed on the optical path, and also in a direction orthogonal to the optical axis of the objective 102. Note that the stage 111 may be a manual stage or a motorized stage.

The transillumination subsystem 120 illuminates the sample placed on the stage 111 from above the stage 111. As illustrated in FIGS. 1 and 2, the transillumination subsystem 120 includes a light source 121 and a universal condenser 122. The light source 121 may be a light-emitting diode (LED) light source or a halogen lamp light source, for example.

As illustrated in FIG. 2, the universal condenser 122 includes a polarizer 123 (first polarizing plate), a plurality of optical elements housed in a turret 124, and a condenser lens 128. The polarizer 123 is used in MC observation, PO observation, and DIC observation. A plurality of optical elements used by being switched depending on the microscopy method are housed in the turret 124. A DIC prism 125 is used in DIC observation. An aperture plate 126 is used in BF observation and PO observation. An optical element 127 is a combination of a slit plate 127a, which is a light-shielding plate having a slit formed therein, and a polarizing plate 127b (second polarizing plate) disposed to cover a portion of the slit. The optical element 127 is used in MC observation.

The eyepiece lens 101 is included in the eyepiece tube 170. The tube lens 103 is disposed between the eyepiece lens 101 and the objective 102. The tube lens 103 forms an optical image of the sample on the basis of transmitted light in an image plane IP between the eyepiece lens 101 and the tube lens 103. Additionally, a projected image described later is also formed in the image plane IP on the basis of light from the projection device 153. With this arrangement, the projected image is superimposed onto the optical image in the image plane IP. The user of the microscope system 1 uses the eyepiece lens 101 to observe a virtual image of the image in which the projected image is superimposed onto the optical image formed in the image plane IP.

As illustrated in FIG. 1, the microscope body 110 includes a laser-assisted hatching unit 130, an imaging unit 140, and a projection unit 150. Also, as illustrated in FIG. 2, the microscope body 110 includes an intermediate magnification change unit 160.

Furthermore, the microscope body 110 includes a DIC prism 105 and an analyzer 106, which are detachable from the optical path.

As illustrated in FIG. 2, the laser-assisted hatching unit 130 is a laser unit disposed between the objective 102 and the tube lens 103. The laser-assisted hatching unit 130 shines laser light onto the sample by introducing laser light from between the objective 102 and the tube lens 103. More specifically, the laser-assisted hatching unit 130 shines laser light onto the zona pellucida surrounding an embryo that grows from a fertilized egg, for example. The laser-assisted hatching unit 130 includes a splitter 131, a scanner 133, a lens 134, and a laser 135. The splitter 131 is a dichroic mirror, for example. The scanner 133 is a galvano scanner, for example, and adjusts the irradiation position of the laser light in a direction orthogonal to the optical axis of the objective 102. The lens 134 converts the laser light into a beam of collimated light. With this arrangement, the laser light is condensed onto the sample by the objective 102.

The imaging unit 140 is an imaging device that acquires digital image data of the sample on the basis of the transmitted light. The imaging unit 140 is disposed between the tube lens 103 and the eyepiece lens 101. As illustrated in FIG. 2, the imaging unit 140 includes a splitter 141 and an imaging element 143. The splitter 141 is a half mirror, for example. The tube lens 103 forms an optical image of the sample on a light-receiving face of the imaging element 143. The imaging element 143 is for example a charge-coupled device (CCD) image sensor or a complementary metal-oxide-semiconductor (CMOS) image sensor that detects lights from the sample, and converts the detected light into an electrical signal by photoelectric conversion. The imaging unit 140 generates digital image data of the sample on the basis of the electrical signal obtained by the imaging element 143.

Note that the microscope system 1 described later is used to observe samples such as sperm, and the fine features of sperm, such as the tail portion for example, are approximately φ0.5 μm. To discern such features in an image, the pixel pitch is demanded to be φ0.5 μm or less when projected onto the object plane. In other words, the pitch of the pixel-projected image in the object plane calculated by dividing the pixel pitch by the total magnification (that is, the magnification of the objective×the magnification of the intermediate magnification change unit×the magnification of a camera adapter not illustrated) is demanded to be φ0.5 μm or less. For example, with the combination of a 20× objective, a 2× intermediate magnification change lens, and a 0.25× camera adapter, the total magnification is 10×. In this case, by using a digital microscope camera having pixel pitch of 3.45 μm, the pitch of the pixel-projected image in the object plane is 0.345 μm, and even the tail portion of sperm is discernible. Note that when selecting the actual digital camera, further consideration should be given such that the region formed by the effective pixels has a size that fills the entire field of view.

The projection unit 150 is disposed between the tube lens 103 and the eyepiece lens 101. As illustrated in FIG. 2, the projection unit 150 includes a splitter 151, a lens 152, and a projection device 153. The splitter 151 is a half mirror, for example. The projection device 153 projects a projected image on the basis of projected image data generated by the processing device 20. The lens 152 projects the projected image by condensing light from the projection device 153 onto the image plane of the tube lens 103, or in other words the same position as the image plane IP where the optical image is formed.

For example, the size of a single sperm from head to tail is roughly 60 μm, and the size of the head is approximately 3 μm across the short side. If such a sperm is projected onto the image plane IP in front of the eyepiece lens with the combination of a 20× objective used for MC observation and a 1× intermediate magnification change lens, the image of the sperm has a size of 1.2 mm×0.06 mm. If projected image data containing such a sperm is created, the result is a rectangle with a minimum size of approximately 1.5 mm×0.1 mm. To project this minimum 0.1 mm gap to be perceivable in the field of view of the eyepiece lens, in the case where the projection magnification of the lens 152 is 1×, it is sufficient to use a projection device 153 including a light-emitting element with a pitch of 0.05 mm or less (in the monochromatic case). This arrangement makes it possible to display a projected image in which the above 0.1 mm gap is perceivable.

Furthermore, the projection device 153 projects a projected image onto a field of view that not only satisfies the field number φ22 of the eyepiece lens, but also an even larger field number of φ23 or greater. Specifically, in the case where the lens 152 has a 1× projection magnification, a projection device 153 having an effective light-emitting area of φ23 or greater is used. With this arrangement, data about sperm in the periphery of the field of view entering the field of view from outside the eyepiece lens field of view is also included in the projected image data. Consequently, it is possible to recognize favorable sperm thoroughly from among all sperm inside the field of view, including the periphery of the eyepiece lens field of view. Note that in this case, the effective pixel area of the imaging element 143 obviously also needs to have a size of φ23 or greater in the eyepiece lens part.

The intermediate magnification change unit 160 is disposed between the objective 102 and the tube lens 103. As illustrated in FIG. 2, the intermediate magnification change unit 160 includes a plurality of lenses (lens 161, lens 162, lens 163), and by switching the lens disposed on the optical path from among these lenses, the magnification of the optical image formed in the image plane is changed. By using the intermediate magnification change unit 160, the magnification of the optical image can be changed without switching the objective 102 positioned close to the sample.

The DIC prism 105 and the analyzer 106 are disposed between the objective 102 and the tube lens 103. The DIC prism 105 is used in DIC observation. The analyzer 106 is used in PO observation and DIC observation.

In the inverted microscope 100, when performing MC observation, the polarizer 123 and the optical element 127 are disposed on the illumination optical path as a first modulation element that modulates the illuminating light irradiating the sample, and the modulator 104 is disposed on the observation optical path as a second modulation element that modulates the transmitted light. Also, when performing PO observation, the polarizer 123 is disposed on the illumination optical path as a first modulation element, and the analyzer 106 is disposed on the observation optical path as a second modulation element. Also, when performing DIC observation, the polarizer 123 and the DIC prism 125 are disposed on the illumination optical path as a first modulation element, and the analyzer 106 and the DIC prism 105 are disposed on the observation optical path as a second modulation element. With this arrangement, an unstained sample can be visualized.

The microscope controller 10 is a device that controls the inverted microscope 100. The microscope controller 10 is connected to the processing device 20, the input device 50, and the inverted microscope 100, and controls the inverted microscope 100 according to commands from the processing device 20 or the input device 50.

The display device 30 is a liquid crystal display, an organic EL (OLED) display, or a cathode ray tube (CRT) display, for example.

The input device 40 includes a handle 41 and a handle 42. The handle 41 and the handle 42 are operated to control the movements of micromanipulators not illustrated that move a pipette 43 and a pipette 44. The pipette 43 and the pipette 44 are used to manipulate the sample in micro-insemination work. The pipette 43 is a holding pipette, for example, and the pipette 44 is an injection pipette, for example.

The input device 50 is a hand switch device for changing the settings of the inverted microscope 100. As illustrated in FIG. 3, the input device 50 includes six buttons (button 51 to button 56), for example, and by simply pressing these buttons, the user is able to quickly switch the settings of the inverted microscope 100.

If the user presses the button 51, the settings of the inverted microscope 100 are switched to settings for BF observation at an observation magnification of 4× (hereinafter designated BF 4× observation). If the user presses the button 52, the settings of the inverted microscope 100 are switched to settings for MC observation at an observation magnification of 10× (hereinafter designated MC 10× observation). If the user presses the button 53, the settings of the inverted microscope 100 are switched to settings for MC observation at an observation magnification of 20× (hereinafter designated MC 20× observation). If the user presses the button 54, the settings of the inverted microscope 100 are switched to settings for MC observation at an observation magnification of 40× (hereinafter designated MC 40× observation). If the user presses the button 55, the settings of the inverted microscope 100 are switched to settings for PO observation at an observation magnification of 20× (hereinafter designated PO 20× observation). If the user presses the button 56, the settings of the inverted microscope 100 are switched to settings for DIC observation at an observation magnification of 60× (hereinafter designated DIC 60× observation).

The input device 60 is a keyboard. The input device 70 is a mouse. The input device 60 and the input device 70 are each connected to the processing device 20.

The identification device 80 is a device that acquires identification information attached to a sample. Note that attaching identification information to a sample includes the case where the identification information is affixed to a container housing the sample, for example. The identification information is information that identifies the sample, and more specifically is information that specifies the patient who provided the sample. The identification device 80 is a barcode reader, an RFID® reader, or a QR Code® reader, for example.

The processing device 20 is a device that controls the microscope system 1 overall. As illustrated in FIG. 1, the processing device 20 is connected to the inverted microscope 100, the microscope controller 10, the display device 30, the input device 60, the input device 70, and the identification device 80. Additionally, the processing device 20 is also connected to the database server 2.

The processing device 20 generates projected image data corresponding to a projected image on the basis of at least digital image data acquired by the imaging unit 140. The projected image includes an assisting image that assists with micro-insemination. Thereafter, the processing device 20 controls the projection device 153 by outputting the projected image data to the projection device 153. As illustrated in FIG. 4, the processing device 20 is provided with a camera control unit 21, an analysis unit 22, a projected image generation unit 23, and a projection control unit 24 mainly as components related to the control of the projection device 153.

The camera control unit 21 acquires digital image data of the sample by controlling the imaging unit 140. The digital image data acquired by the camera control unit 21 is outputted to the analysis unit 22.

The analysis unit 22 analyzes at least the digital image data acquired by the camera control unit 21, and outputs an analysis result to the projected image generation unit 23. The projected image generation unit 23 generates projected image data corresponding to the projected image including the assisting image that assists with micro-insemination on the basis of the analysis result generated by the analysis unit 22, and outputs the generated projected image data to the projection control unit 24.

More specifically, for example, in the case where the user uses the microscope system 1 to perform ICSI, the analysis unit 22 may for example generate an analysis result that specifies candidate cells, that is, reproductive cells suitable for fertilization from among the reproductive cells included in the sample, on the basis of at least the digital image data. In this case, the projected image generation unit 23 may also generate projected image data corresponding to the projected image including an image (first assisting image) that specifies candidate cells as the assisting image.

The projection control unit 24 controls the projection of the projected image onto the image plane by controlling the projection device 153. More specifically, the projection control unit 24 outputs the projected image data to the projection device 153, thereby causing the projection device 153 to project the projected image onto the image plane on the basis of the projected image data acquired from the projection control unit 24.

The microscope system 1 configured as above is capable of superimposing the projected image including the assisting image that assists with micro-insemination onto the optical image. For this reason, the user is able to obtain information necessary for micro-insemination while observing the sample. Consequently, according to the microscope system 1, it is possible to assist with micro-insemination performed by the user. This configuration makes it possible to reduce inconsistencies in fertilization success rates among embryologists performing micro-insemination, and an improvement in fertilization success rates may be expected.

Furthermore, in the microscope system 1, the projected image is projected onto the image plane between the eyepiece lens 101 and the tube lens 103 and superimposed onto the optical image. For this reason, the user is able to obtain various information that assists with micro-insemination while peering into the eyepiece lens 101, and movement of the line of sight, such as line of sight going back and forth between a monitor and the eyepiece lens 101, can be avoided compared to a case where the assisting image is displayed on a monitor or the like. Consequently, according to the microscope system 1, the user is able to obtain information necessary for micro-insemination from the projected image by simply observing the sample using the optical image, without taking his or her eyes away from the eyepiece lens 101. With this arrangement, the microscope system 1 is capable of assisting with the work of micro-insemination with the assisting image and reducing the burden on the user for micro-insemination, without changing the user's workflow. Also, the work time of the user is shortened, and as a result, the amount of time that the sample is exposed to open air under the microscope is also shortened, thereby reducing the damage received by the sample.

Note that the processing device 20 included in the microscope system 1 may be a general-purpose device or a special-purpose device. The processing device 20 is not particularly limited in configuration, but may have a physical configuration like the one illustrated in FIG. 5, for example. Specifically, the processing device 20 may be provided with a processor 20a, a memory 20b, an auxiliary storage device 20c, an input/output interface 20d, a medium driving device 20e, and a communication control device 20f, and these components may be interconnected by a bus 20g.

The processor 20a is a processing circuit of any type, such as a central processing unit (CPU), for example. The processor 20a may execute programs stored in the memory 20b, the auxiliary storage device 20c, and a storage medium 20h to perform programmed processes, and thereby achieve the components (camera control unit 21, analysis unit 22, projected image generation unit 23, projection control unit 24) related to the control of the projection device 153 described above. In addition, the processor 20a may also be configured using a dedicated processor such as an application-specific integrated circuit (ASIC) or a field-programmable gate array (FPGA), and may also be configured using a graphics processing unit (GPU).

The memory 20b is a working memory for the processor 20a. The memory 20b is a semiconductor memory of any type, such as random access memory (RAM), for example. The auxiliary storage device 20c is a non-volatile memory such as erasable programmable ROM (EPROM), a hard disk drive (HDD), or a solid-state drive (SSD). The input/output interface 20d exchanges information with external devices (inverted microscope 100, microscope controller 10, display device 30, input device 60, input device 70, identification device 80).

The medium driving device 20e is capable of outputting data stored in the memory 20b and the auxiliary storage device 20c to the storage medium 20h, and is also capable of reading out information such as programs and data from the storage medium 20h. The storage medium 20h is a portable recording medium of any type. For example, the storage medium 20h may be an SD card, Universal Serial Bus (USB) flash memory, a Compact Disc (CD), or a Digital Versatile Disc (DVD).

The communication control device 20f inputs and outputs information with respect to a network. For example, a device such as a network interface card (NIC), a Wi-Fi® module, a Bluetooth® module, or a BLE module may be adopted as the communication control device 20f. The bus 20g interconnects components such as the processor 20a, the memory 20b, and the auxiliary storage device 20c such that data can be exchanged among the components.

Figure 8:
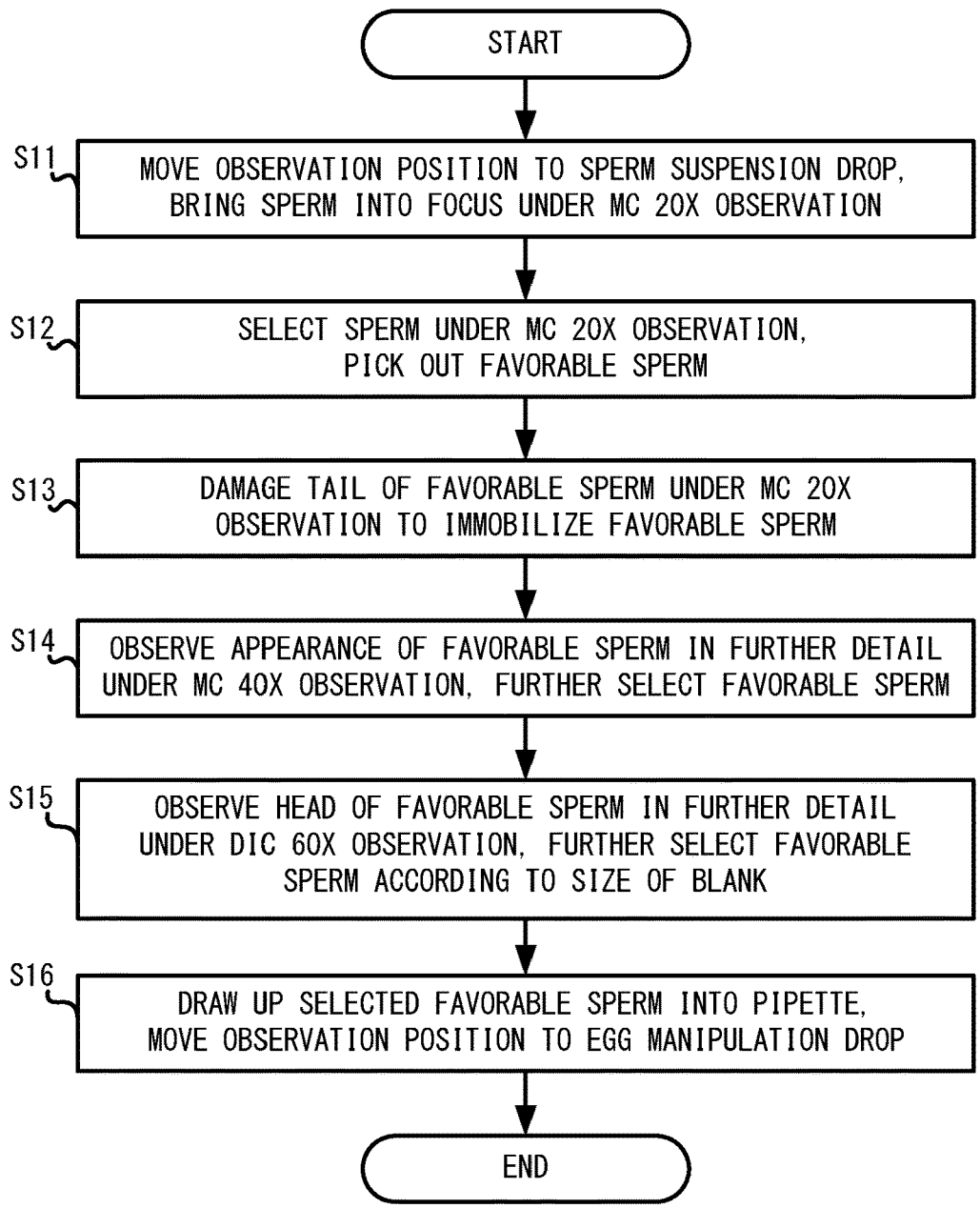
FIG. 8 is a flowchart illustrating an example of a sperm selection procedure.
Figure 10:
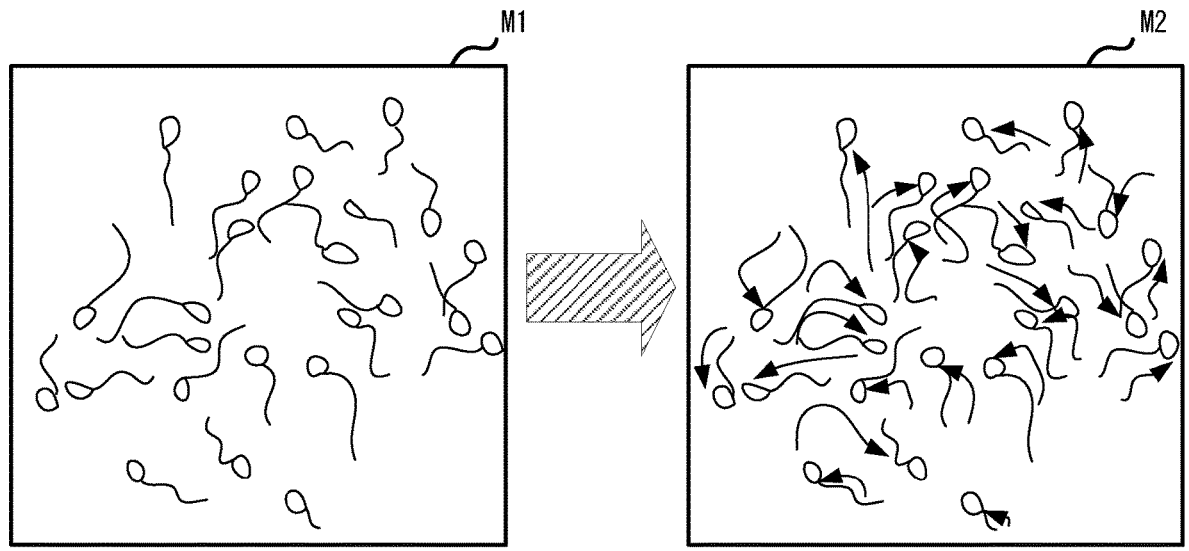
FIG. 10 is a diagram for explaining an image processing method performed by an analysis unit 22.
Figure 11:
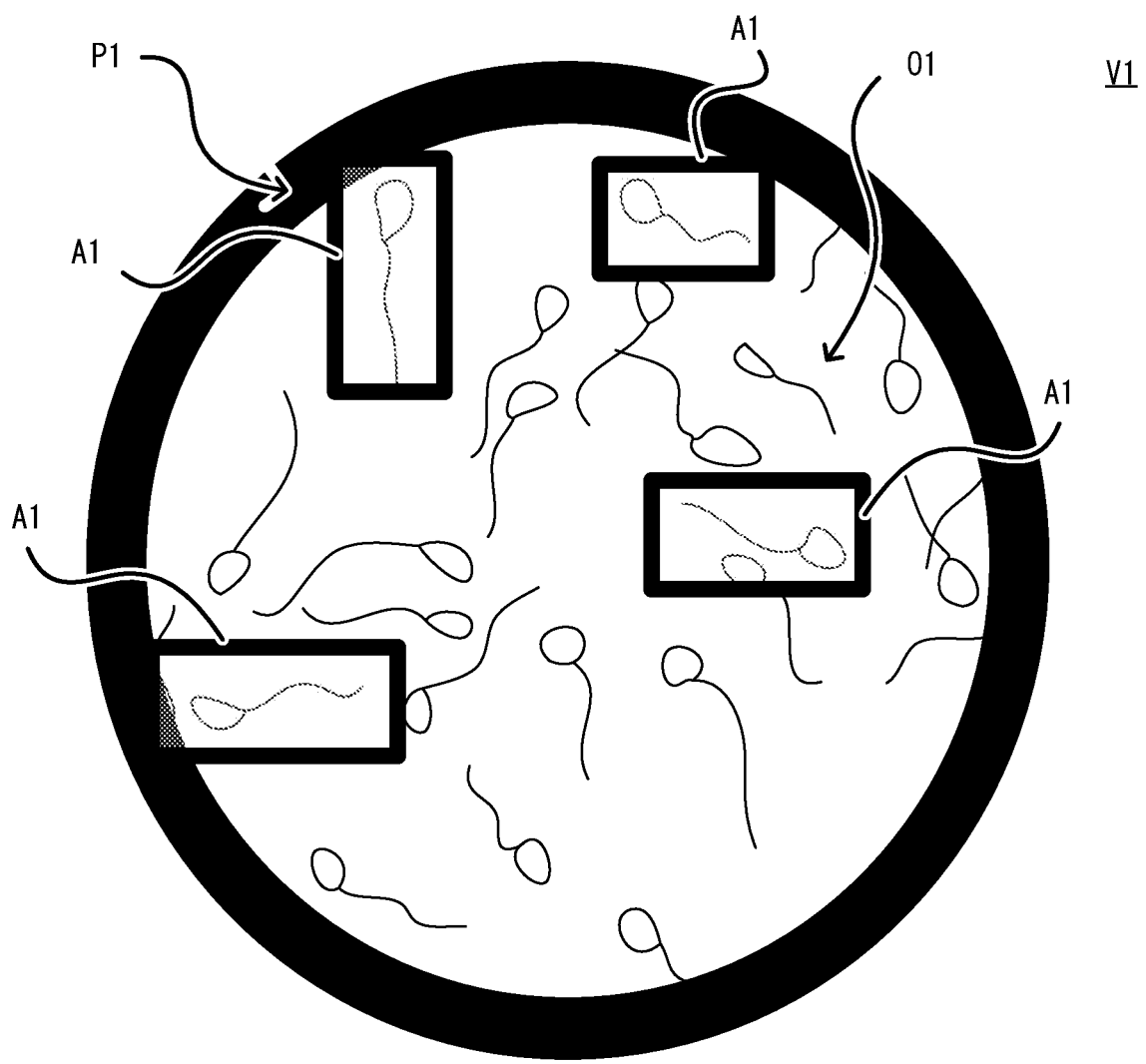
FIG. 11 is a diagram illustrating an example of an image seen from an eyepiece lens 101.

FIG. 6 is a flowchart illustrating an example of an ICSI procedure. FIG. 7 is a diagram illustrating an example of a configuration of a drop formed as a sample 200 inside a Petri dish 210. FIG. 8 is a flowchart illustrating an example of a sperm selection procedure. FIG. 9 is a flowchart of an image projection process performed by the microscope system 1. FIG. 10 is a diagram for explaining an image processing method performed by an analysis unit 22. FIG. 11 is a diagram illustrating an example of an image seen from an eyepiece lens 101. Hereinafter, an ICSI procedure that the user performs using the microscope system 1 will be described specifically with reference to FIGS. 6 to 11.

First, the user prepares a sample (step S1). At this point, the user creates a sample 200 including a plurality of drops inside a Petri dish 210 as illustrated in FIG. 7 for example, and places the sample 200 onto the stage 111.

A drop 201 is a cleaning drop used to clean the pipettes. Drops 202 are sperm suspension drops in which a sperm suspension is dropped into a PVP solution, for example. Drops 203 are egg manipulation drops in which eggs are placed in an m-HTF solution, for example. Note that the m-HTF solution is a Hepps-containing HTF solution to which 10% serum has been added. These drops are covered with mineral oil.

Next, the user sets up the microscope system 1 (step S2). At this point, the user presses the button 51 of the input device 50 to switch the settings of the microscope system 1 to BF 4× observation, for example. Thereafter, the user operates the input device 40 to adjust the positions of the pipette 43 and the pipette 44, and bring the pipette 43 and the pipette 44 into focus. Furthermore, the user moves the stage 111 to clean the pipette 43 and the pipette 44 with the drop 201 (cleaning drop).

When setup is completed, the user checks the growth state of the eggs (oocytes) inside the drops 203 (egg manipulation drops) (step S3). At this point, the user presses the button 53 of the input device 50 to switch the settings of the microscope system 1 to MC 20× observation, for example. The user observes the state of the eggs at MC 20× observation, and selects an egg. Additionally, the user may also press the button 55 of the input device 50 to switch the settings of the microscope system 1 to PO 20× observation, for example. By observing the spindles of the eggs at PO 20× observation, the user may assess the maturity of the eggs to further select an egg.

When the selection of an egg is finished, the user selects a sperm according to the procedure illustrated in FIG. 8 (step S4). First, the user presses the button 53 of the input device 50 to switch the settings of the microscope system 1 to MC 20× observation, for example. Next, the user moves the stage 111 to move the observation position to the drops 202 (sperm suspension drops), and bring the sperm into focus at MC 20× observation (step S11).

Next, the user selects sperm at MC 20× observation, and picks out favorable sperm suitable for fertilization (step S12). Whether a sperm is favorable or not is generally determined on the basis of the appearance and motility of the sperm, but definitive criteria do not exist. For this reason, the selection of sperm often depends on the experience and intuition of the embryologist acting as the user of the microscope system 1, and the judgment differs depending on the embryologist. This is a factor that leads to differences in fertilization success rates among embryologists.

Accordingly, the microscope system 1 estimates that a sperm selected by an experienced embryologist with a high fertilization success rate are favorable sperm suitable for fertilization, and notifies the user of the microscope system 1 about the estimated sperm as candidate cells (candidate sperm).

Specifically, in step S12, the microscope system 1 notifies the user of candidate cells by performing the image projection process illustrated in FIG. 9. First, the microscope system 1 projects an optical image O1 of the sample onto the image plane (step S21). At the same time, in the microscope system 1, the imaging unit 140 acquires digital image data of the sample (step S22).

The digital image data acquired by the imaging unit 140 is outputted to the processing device 20, and the analysis unit 22 of the processing device 20 generates an analysis result that specifies candidate cells (candidate sperm) on the basis of the digital image data (step S23). The analysis algorithm that specifies the candidate cells is not particularly limited, but it is desirable to reproduce selection by an experienced embryologist with a high fertilization success rate. More specifically, it is desirable for the analysis unit 22 to analyze sperm on the basis of at least the appearance and motility of the sperm as a reproductive cell, and thereby reproduce selection by an experienced embryologist with a high fertilization success rate. Additionally, the digital image data used for the analysis may be still image data or moving image data. However, because it is difficult to analyze the motility of sperm on the basis of still image data, as illustrated in FIG. 10, the analysis unit 22 may first process and combine the still image data of a still image M1 with an image indicating motility (an image of arrows), and thereby generate still image data of a still image M2. The image indicating motility is an image indicating a trail of movement by the sperm from the point in time going back a predetermined length of time to the current point, and may be generated on the basis of plural image data acquired within a corresponding period. Additionally, the appearance and motility of the sperm may be analyzed on the basis of the still image data of the still image M2 obtained by combination with the image indicating motility, and an analysis result that specifies a candidate sperm may be generated.

Note that a rule-based algorithm that reproduces selection by an experienced embryologist may be adopted by the analysis unit 22. Furthermore, an algorithm (model) for estimating favorable sperm may be trained to select sperm like an experienced embryologist through machine learning, and the trained model may be adopted by the analysis unit 22. Note that the machine learning may be traditional machine learning in which features necessary for estimation are given in advance by humans, or deep learning in which features are extracted by the machine itself.

When the analysis result is generated, the projected image generation unit 23 of the processing device 20 generates projected image data corresponding to a projected image P1 including an assisting image A1 that specifies each candidate cell based on the analysis result (step S24), and outputs the generated projected image data to the projection device 153. Thereafter, the projection device 153 projects the projected image P1 onto the image plane on the basis of the projected image data (step S25).

With this configuration, an image V1 in which the projected image P1 including the assisting image(s) A1 is superimposed onto an optical image O1 is formed in the image plane, as illustrated in FIG. 11 for example. Each assisting image A1 illustrated in FIG. 11 is an image that surrounds an image of a candidate cell. The projected image P1 includes the assisting image A1 at a position that does not overlap with the image of each candidate cell when projected onto the image plane. With this arrangement, the microscope system 1 can notify the user of candidate cells without interfering with the observation of the candidate cells.

By causing the image V1 in which the projected image P1 is superimposed onto the optical image O1 to be formed in the image plane, in step S12, the user can select sperm while paying attention to the candidate cells (candidate sperm) specified by the assisting images A1, and pick out favorable sperm. Consequently, the sperm selection work becomes easy, and the burden imposed by the selection work is reduced substantially.

When favorable sperm are picked out, the user damages the tail of each favorable sperm at RC 20× observation to immobilize the favorable sperm (step S13). At this point, the user immobilizes the favorable sperm by abrading the tail of the favorable sperm against the floor of the Petri dish 210 with a pipette.

Thereafter, the user observes the appearance of the immobilized favorable sperm in further detail, and further selects favorable sperm (step S14). At this point, the user presses the button 54 of the input device 50 to switch the settings of the microscope system 1 to MC 40× observation, for example. Subsequently, the user picks out favorable sperm at MC 40× observation. Note that in step S14, like step S12, the microscope system 1 may estimate favorable sperm that an experienced embryologist with a high fertilization success rate would select, and notify the user of the microscope system 1 about the estimated favorable sperm as candidate cells (candidate sperm). However, because the sperm is immobilized, step S14 differs from step S12 in that the analysis unit 22 analyzes the sperm on the basis of at least the appearance of the sperm.

When the selection of favorable sperm at MC 40× observation is completed, the user further observes the heads of the favorable sperm in detail, and further selects favorable sperm according to the size of the blank existing in the head (step S15). At this point, the user presses the button 56 of the input device 50 to switch the settings of the microscope system 1 to DIC 60× observation, for example. Thereafter, the user picks out the favorable sperm having a small blank at DIC 60× observation. Note that step S15 may also be performed under MC 40× observation. In this case, the user picks out favorable sperm by recognizing a bright spot in the head as a blank.

Subsequently, the user draws up the chosen favorable sperm into the pipette 44 acting as the injection pipette, moves the observation position to one of the drops 203 (egg manipulation drops) (step S16), and ends the series of steps in the sperm selection illustrated in FIG. 8.

When sperm selection is completed, the user checks the position of the spindle to prepare for injection of favorable sperm (step S5). At this point, the user observes the egg chosen in step S3 existing inside one of the drops 203, and checks the position of the spindle of the egg. Specifically, the user presses the button 55 of the input device 50 to switch the settings of the microscope system 1 to PO 20× observation, for example. Thereafter, the user reorients the spindle by manipulating the pipette 43 acting as the holding pipette, such that the spindle of the egg visualized at PO 20× observation is positioned in the 12 o'clock or the 6 o'clock direction. This is to avoid damaging the spindle with the pipette that is thrust into the egg from the 3 o'clock or 9 o'clock direction in step S6 described later.

Finally, the user injects the sperm into the egg (step S6), and ends ICSI. At this point, the user presses the button 53 of the input device 50 to switch the settings of the microscope system 1 to MC 20× observation, for example. Thereafter, the user holds the egg in place with the pipette 43 acting as the holding pipette in the direction adjusted in step S5 at MC 20× observation, and thrusts the pipette 44 acting as the injection pipette. Subsequently, the favorable sperm is injected into the egg from the pipette 44.

When the series of ICSI steps illustrated in FIG. 6 ends, the user returns the egg containing the injected sperm to an incubator for cultivation. Additionally, the user may also operate the processing device 20 using the input device 60 and the input device 70 to save information obtained by ICSI in the database server 2. For example, patient information about the sperm and the egg (such as clinical data about the mother and examination results regarding the semen containing the sperm), and data about the culture fluid of the sperm and the egg (such as the type, concentration, and pH, for example) may be associated with information such as image data of the egg containing the injected sperm, image data of the favorable sperm picked out, and the ICSI work time, and saved in the database server 2. This information may also be used in the analysis by the analysis unit 22 used in steps S12 and S14 of FIG. 8. In other words, the processing device 20 may generate projected image data corresponding to a projected image including an assisting image on the basis of digital image data as well as other data saved in the database server 2. In this way, by synthesizing a variety of information not solely limited to image data to estimate favorable sperm, the achievement of even higher fertilization success rates may be expected.

As above, in ICSI with the microscope system 1, a projected image including an assisting image that specifies candidate sperm is projected onto the image plane. The size of sperm is approximately 60 μm, and an objective with a magnification of at least 20× is used to distinguish favorable sperm. Because the field number of an inverted microscope is generally approximately 22, the actual field of view is approximately φ1 mm. It is extremely difficult to perform the work of selecting freely-moving sperm inside a region with an actual field of view of φ1 mm. Generally, because the sperm estimated to be favorable sperm have high motility and the ICSI work needs to be performed in a short time, the sperm selection work requires the user to observe the appearance of relatively fast-moving sperm quickly and judge whether the sperm is favorable or not. In a work environment where such tough constraints are imposed, superimposing an assisting image that specifies a candidate sperm estimated as a favorable sperm onto an optical image greatly contributes to reducing the burden of the sperm selection work. Moreover, by utilizing the knowledge of experienced embryologists in the analysis for specifying candidate sperm, and incorporating such knowledge as an analysis algorithm, improved fertilization success rates can be achieved while at the same time also reducing inconsistencies in fertilization success rates among embryologists. Consequently, according to the microscope system 1, it is possible to assist with sperm selection by the user effectively.

FIGS. 12 to 15 are diagrams illustrating other examples of images seen from the eyepiece lens 101. In step S12, the microscope system 1 may superimpose any of the projected images P2 to P5 illustrated in FIGS. 12 to 15 instead of the projected image P1 illustrated in FIG. 11 onto the optical image O1.

Figure 12:
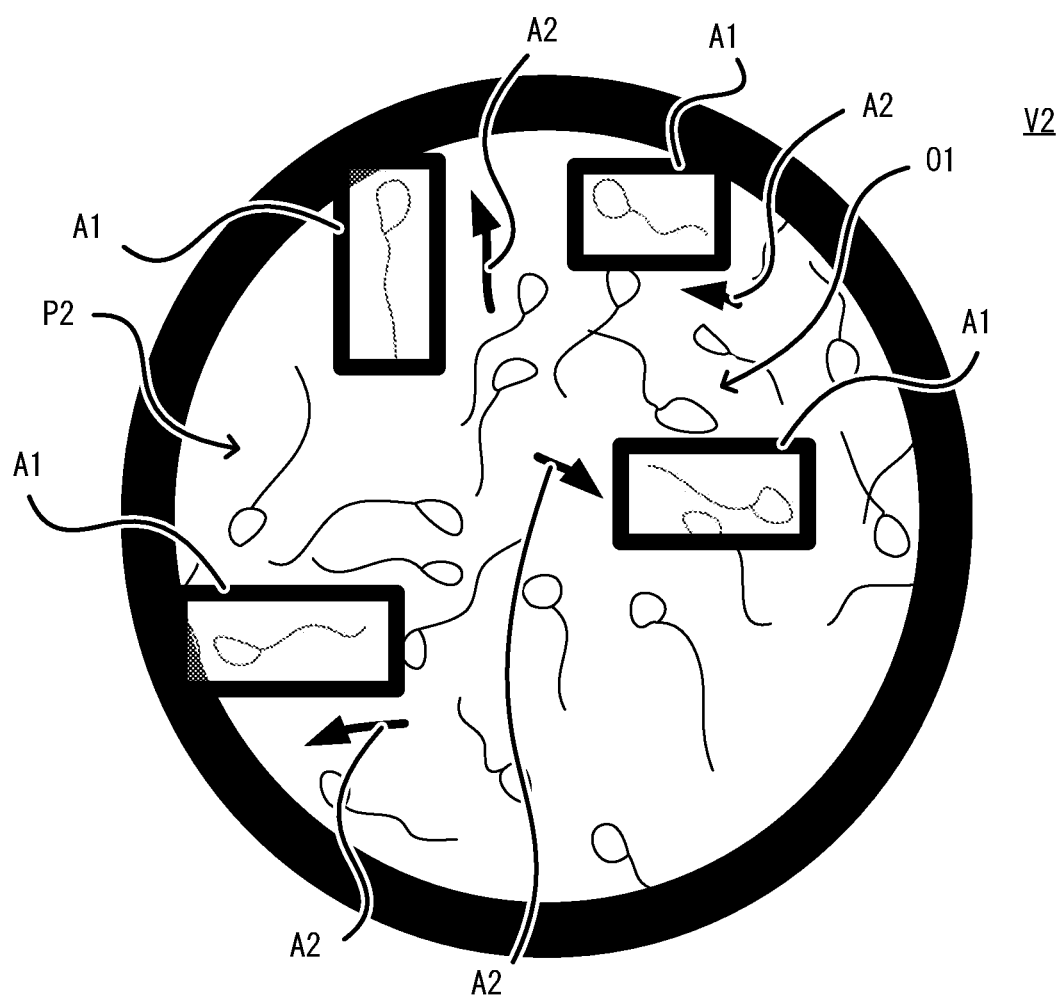
FIG. 12 is a diagram illustrating another example of an image seen from the eyepiece lens 101.

An image V2 illustrated in FIG. 12 is obtained by superimposing a projected image P2 onto the optical image O1. FIG. 11 illustrates an example in which the projected image P1 includes the assisting image A1 having a shape that surrounds each image of a candidate sperm, but the projected image may also include other images. The projected image P2 includes an assisting image A2 indicating the trail of movement of each candidate sperm in addition to the assisting image A1 that specifies each candidate sperm. The assisting image A2 expresses the motility of each candidate sperm with the trail of movement. By projecting the projected image P2 illustrated in FIG. 12 onto the image plane, sperm selection by the user is made even easier. Note that, like the assisting image A1, to avoid interfering with the observation of the candidate sperm, it is desirable for the assisting image A2 to be included at a position that does not overlap with the image of each candidate sperm in the projected image P2.

Figure 13:
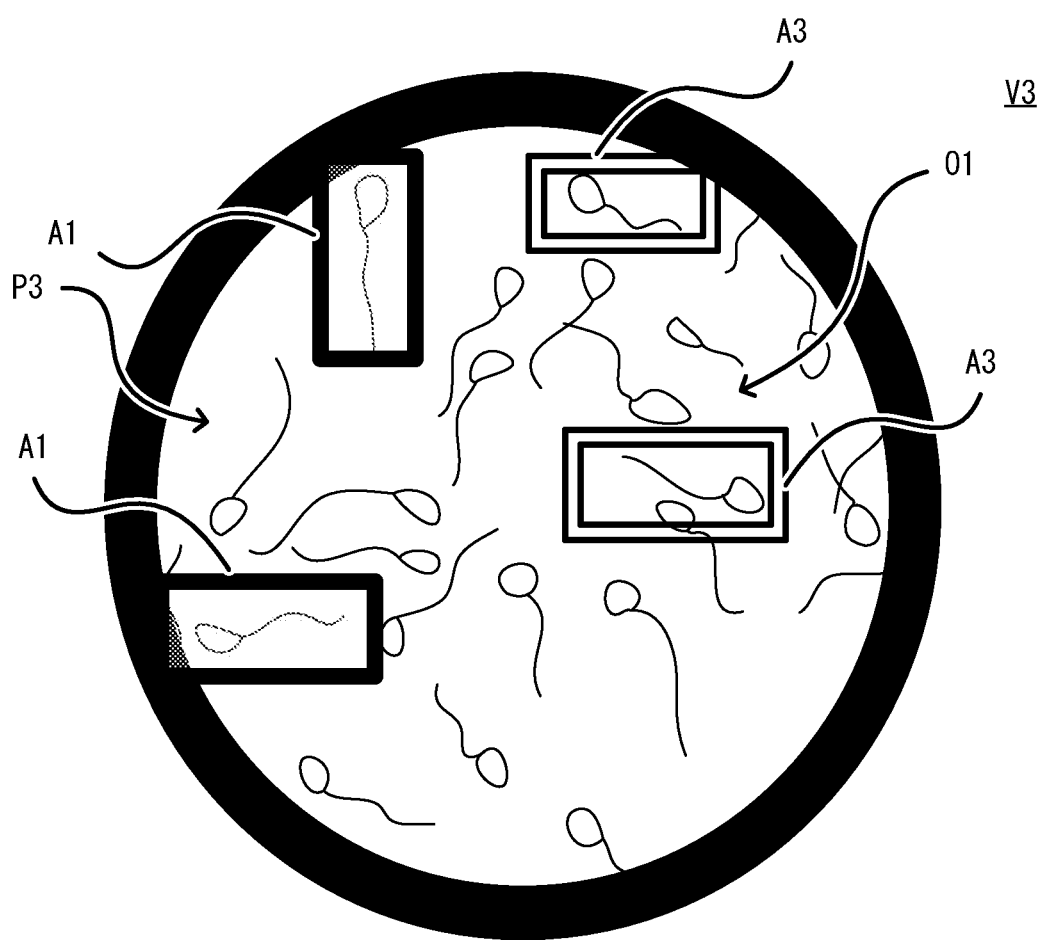
FIG. 13 is a diagram illustrating yet another example of an image seen from the eyepiece lens 101.

An image V3 illustrated in FIG. 13 is obtained by superimposing a projected image P3 onto the optical image O1. FIG. 11 illustrates an example of specifying candidate sperm with a single type of image (assisting image A1), but candidate sperm may also be specified with multiple types of images. The projected image P3 includes two types of images (assisting image A1 and assisting image A3) that specify candidate sperm. The assisting image A3 is an image that specifies candidate sperm having a lower degree of recommendation compared to the assisting image A1, and the color of the assisting image A3 (light blue, for example) is different from the color of the assisting image A1 (dark blue, for example). In other words, the assisting image A1 and the assisting image A3 are respectively colored according to the degree of recommendation of the candidate sperm specified by the assisting image. By projecting the projected image P3 illustrated in FIG. 13 onto the image plane, the user is able to grasp which candidate sperm should be prioritized for further scrutiny, making the sperm selection work even easier to perform. Furthermore, the degree of recommendation of sperm may be absolute or relative. In actuality, some patients may only have suboptimal sperm overall, and in such cases, a relatively healthy sperm is selected from among the limited choices. In this case, even if the degree of recommendation is absolute, if the system is set to project multiple images indicating multiple types of degrees of recommendation, then at least an image indicating a relatively low degree of recommendation will be projected. Expressed in terms of the above example, the assisting image A3 with a light blue color will be projected even if the assisting image A1 with a dark blue color is not projected. Consequently, the possibility where no assisting images are projected at all can be greatly reduced. Note that it is sufficient to project multiple types of images indicating different degrees of recommendation, and three or more types of images indicating different degrees of recommendation may also be projected. Furthermore, the images are not limited to indicating high degrees of recommendation, and images indicating particularly low degrees of recommendation may also be projected.

Figure 14:
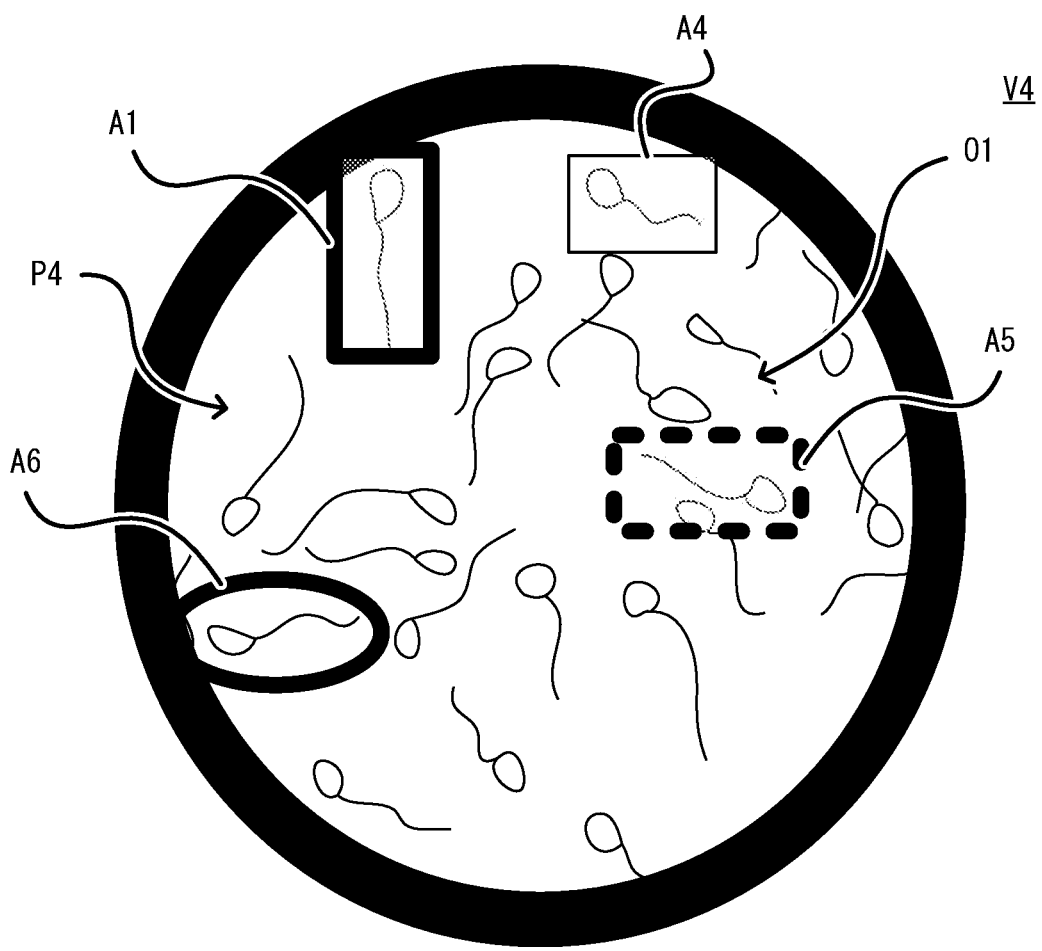
FIG. 14 is a diagram illustrating yet another example of an image seen from the eyepiece lens 101.

An image V4 illustrated in FIG. 14 is obtained by superimposing a projected image P4 onto the optical image O1. FIG. 13 illustrates an example of an assisting image colored according to the degree of recommendation of candidate sperm, but it is sufficient for an assisting image to have a different appearance depending on the degree of recommendation of the candidate sperm specified by the assisting image. The projected image P4 includes four types of images (assisting image A1, assisting image A4, assisting image A5, and assisting image A6) that specify candidate sperm. These assisting images have different line styles or shapes from each other, and express degrees of recommendation of candidate sperm according to the differences in the line styles or shapes. Like the case of projecting the projected image P3 illustrated in FIG. 13, by projecting the projected image P4 illustrated in FIG. 14 onto the image plane, the user is able to grasp which candidate sperm should be prioritized for further scrutiny, making the sperm selection work even easier to perform.

Figure 15:
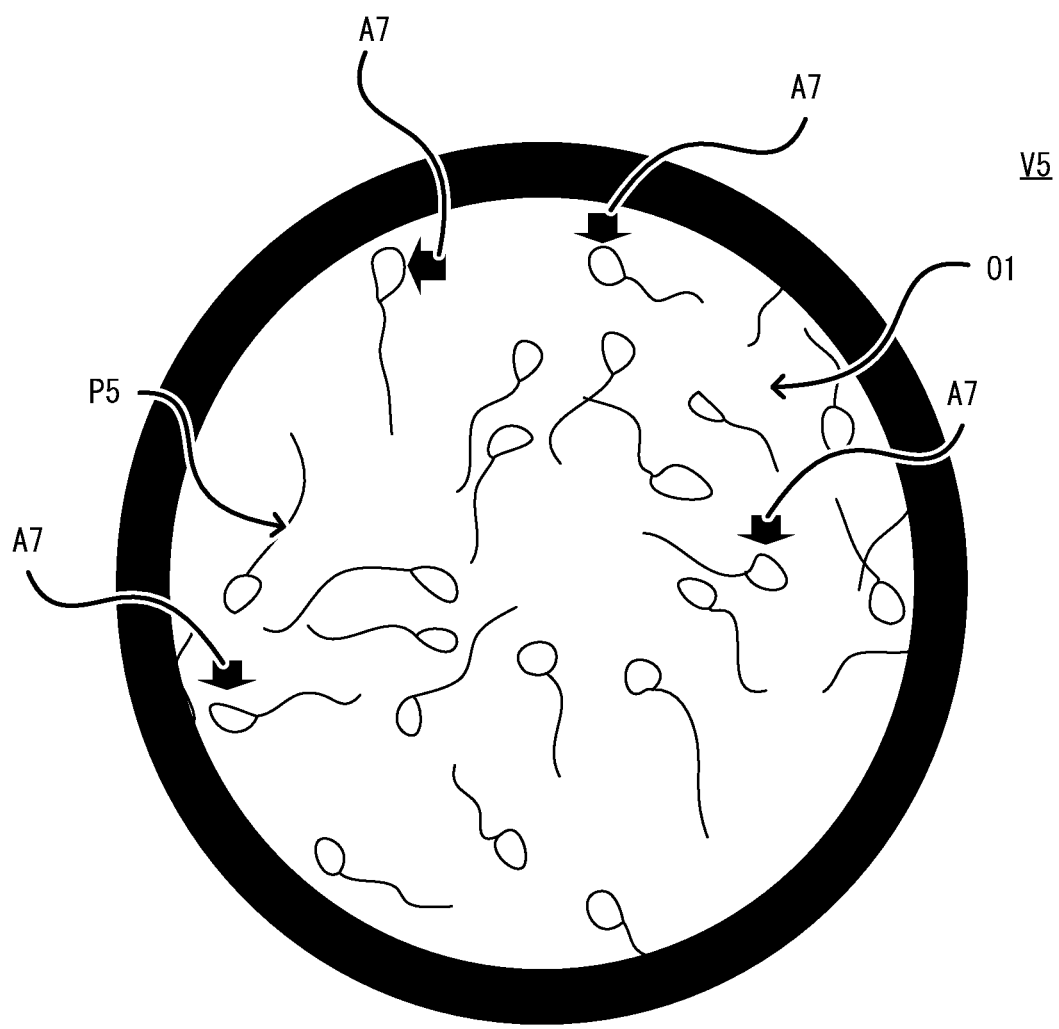
FIG. 15 is a diagram illustrating yet another example of an image seen from the eyepiece lens 101.

An image V5 illustrated in FIG. 15 is obtained by superimposing a projected image P5 onto the optical image O1. FIG. 11 illustrates an example in which the projected image P1 includes the assisting image A1 having a shape that surrounds each image of a candidate sperm, but it is sufficient for the projected image to include an image that specifies a candidate sperm. The projected image P5 illustrated in FIG. 15 includes an assisting image A7 having a shape that points out an image of a candidate sperm. Like the case of projecting the projected image P1 illustrated in FIG. 11, by projecting the projected image P5 onto the image plane, the user can easily grasp the candidate sperm, and the burden of the sperm selection work can be greatly reduced.

Figure 16:
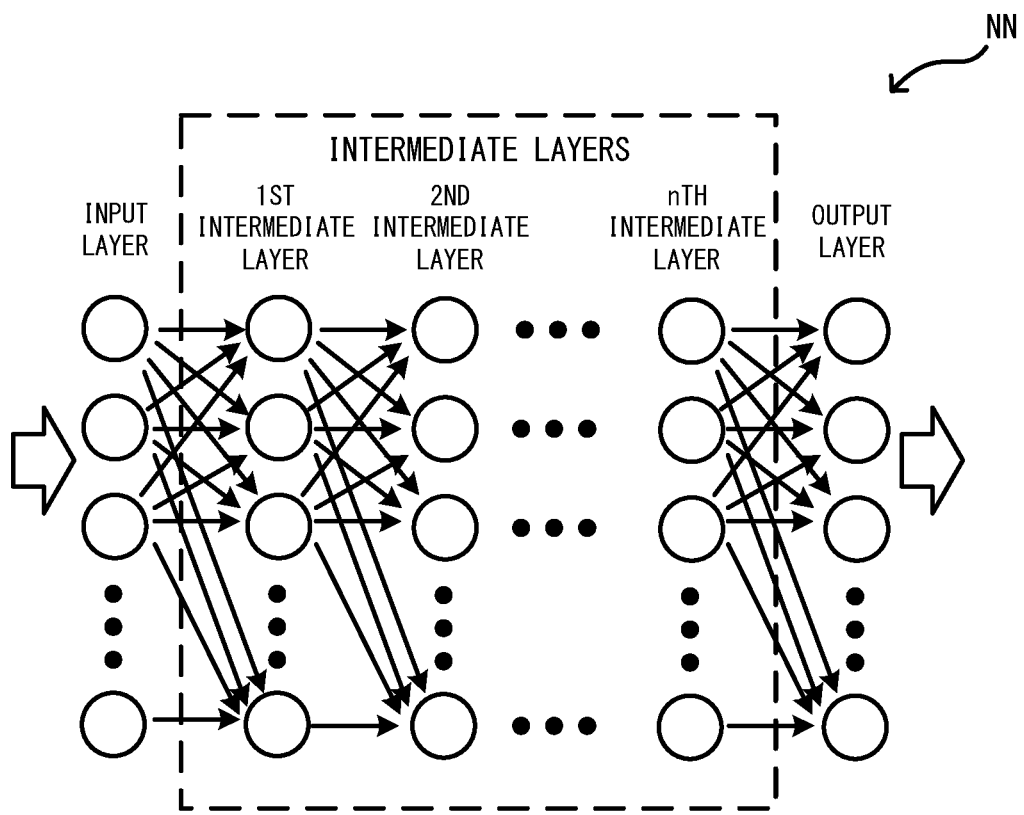
FIG. 16 is a diagram illustrating a configuration of a neural network.
Figure 17:
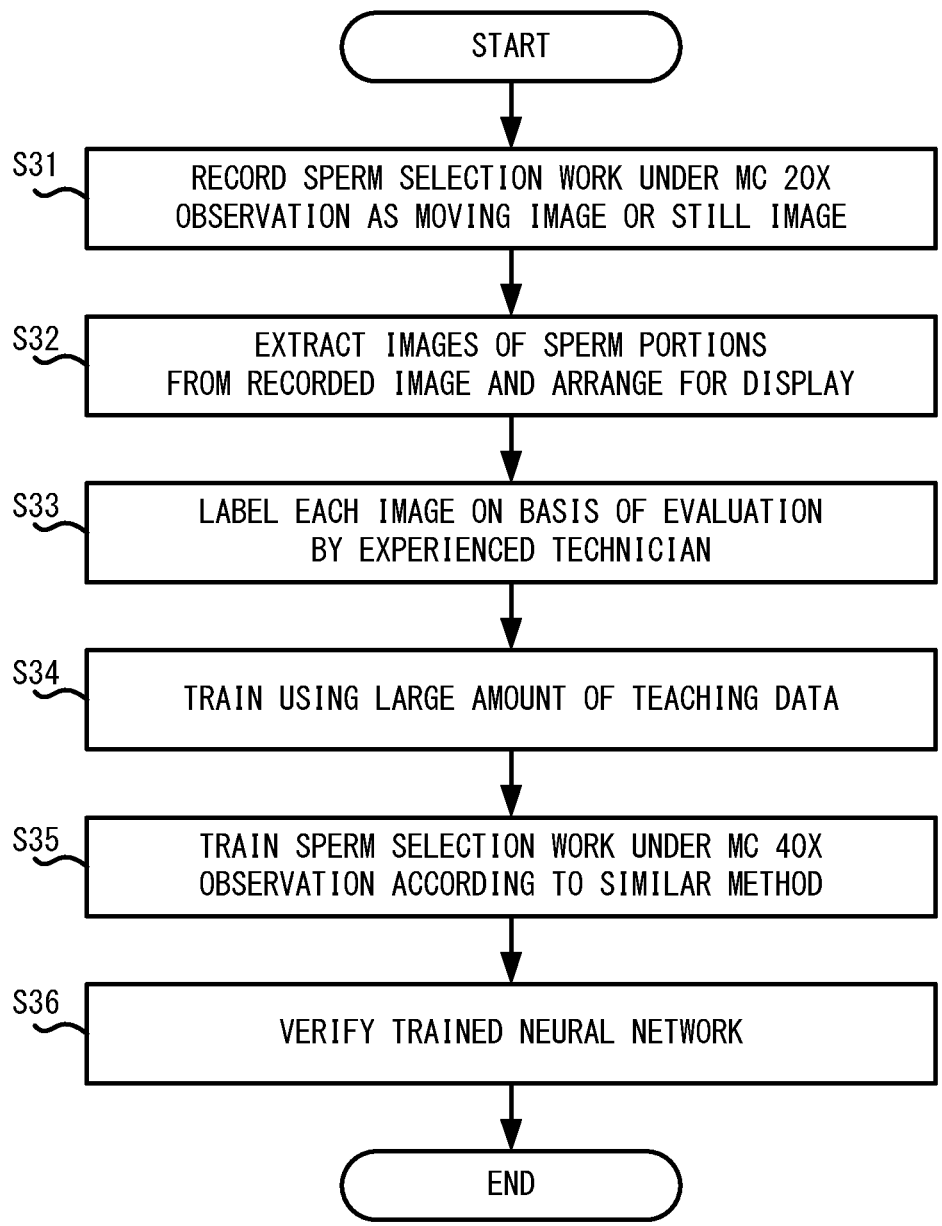
FIG. 17 is a flowchart illustrating an example of a training procedure.
Figure 18:
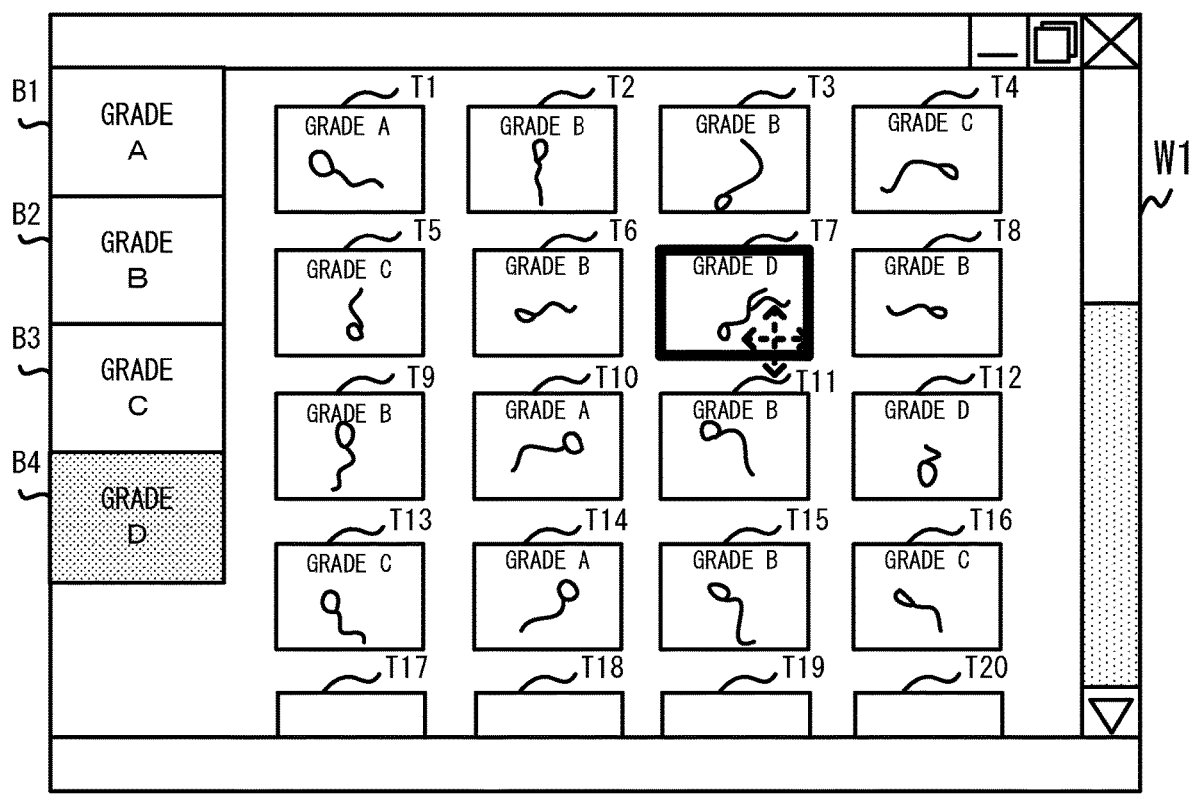
FIG. 18 is a diagram for explaining a method of applying labels to teaching images.

FIG. 16 is a diagram illustrating a configuration of a neural network. FIG. 17 is a flowchart illustrating an example of a training procedure. FIG. 18 is a diagram for explaining a method of applying labels to teaching images. As described above, the analysis unit 22 may adopt a model trained by machine learning or a neural network trained by deep learning, for example. In other words, the analysis unit 22 may use a trained neural network to at least analyze digital image data. Hereinafter, a procedure for training the neural network NN illustrated in FIG. 16 to recognize favorable sperm will be described with reference to FIGS. 16 to 18.

First, the microscope system 1 records the work of selecting sperm performed under MC 20× observation as a moving image or a still image (step S31). At this point, during the sperm selection work, the imaging unit 140 acquires image data, and the processing device 20 saves the image data.

Next, the microscope system 1 extracts images of sperm portions from the recorded image, and arranges the extracted images for display (step S32). At this point, the processing device 20 reads out the moving image data or still image data saved in step S31, extracts images of sperm portions from the moving image or still image as teaching images, and arranges the teaching images for display on the display device 30. The teaching images arranged for display are evaluated by an experienced embryologist with a high fertilization success rate.

As illustrated in FIG. 18, after each of the teaching images has been evaluated by an embryologist, the microscope system 1 labels the teaching images on the basis of the evaluations by an experienced embryologist (step S33). At this point, the evaluation results (labels) provided by the experienced embryologist are saved in association with the teaching images.

Hereinafter, data combining the teaching images and the labels will be referred to as teaching data.

Note that in the example of FIG. 18, teaching images (T1, T10, T14, . . . ) that are clicked while a button B1 is selected in a window W1 are saved in association with a Grade A label. Also, teaching images (T2, T3, T6, T8, T9, T11, T15, . . . ) that are clicked while a button B2 is selected are saved in association with a Grade B label. Also, teaching images (T4, T5, T13, T16, . . . ) that are clicked while a button B3 is selected are saved in association with a Grade C label. Also, teaching images (T7, T12, . . . ) that are clicked while a button B4 is selected are saved in association with a Grade D label. Note that Grades A, B, C, and D indicate successively lower degrees of recommendation in the above order.

When the teaching data is created by step S33, the microscope system 1 uses a large amount of created teaching data to train a neural network (step S34).

Thereafter, the microscope system 1 performs processes similar to steps S31 to S33 for selection work under MC 40× observation to train the neural network (step S35). With this arrangement, the microscope system 1 obtains a trained neural network. In other words, the trained neural network of the microscope system 1 is a neural network that has been trained using image data corresponding to images of sperm labeled as suitable or unsuitable for fertilization as the teaching data.

Finally, the microscope system 1 verifies the trained neural network (step S36). At this point, the microscope system 1 verifies whether or not the neural network recognizes favorable sperm appropriately with respect to different sperm than the training stage, for example. If the verification result confirms that favorable sperm is recognized appropriately, the trained neural network obtained in step S35 is adopted by the analysis unit 22.

As above, by generating teaching data and training a neural network according to the procedure illustrated in FIG. 17, an analysis algorithm for sperm selection utilizing the knowledge of an experienced embryologist can be constructed easily. Consequently, for example, neural networks may be trained in units of hospitals, or further trained in units of hospitals, and a different model for each hospital may be adopted in the analysis unit 22. This arrangement makes it possible to easily accommodate favorable sperm selection conforming to the guidelines of each hospital.

Note that although FIG. 17 illustrates an example of using the microscope system 1 to generate the teaching data and train the neural network, the generation of the teaching data and the training of the neural network may also be performed by a different system from the microscope system 1, and a trained neural network that has been constructed on another system may be applied to the microscope system 1.

Figure 19:
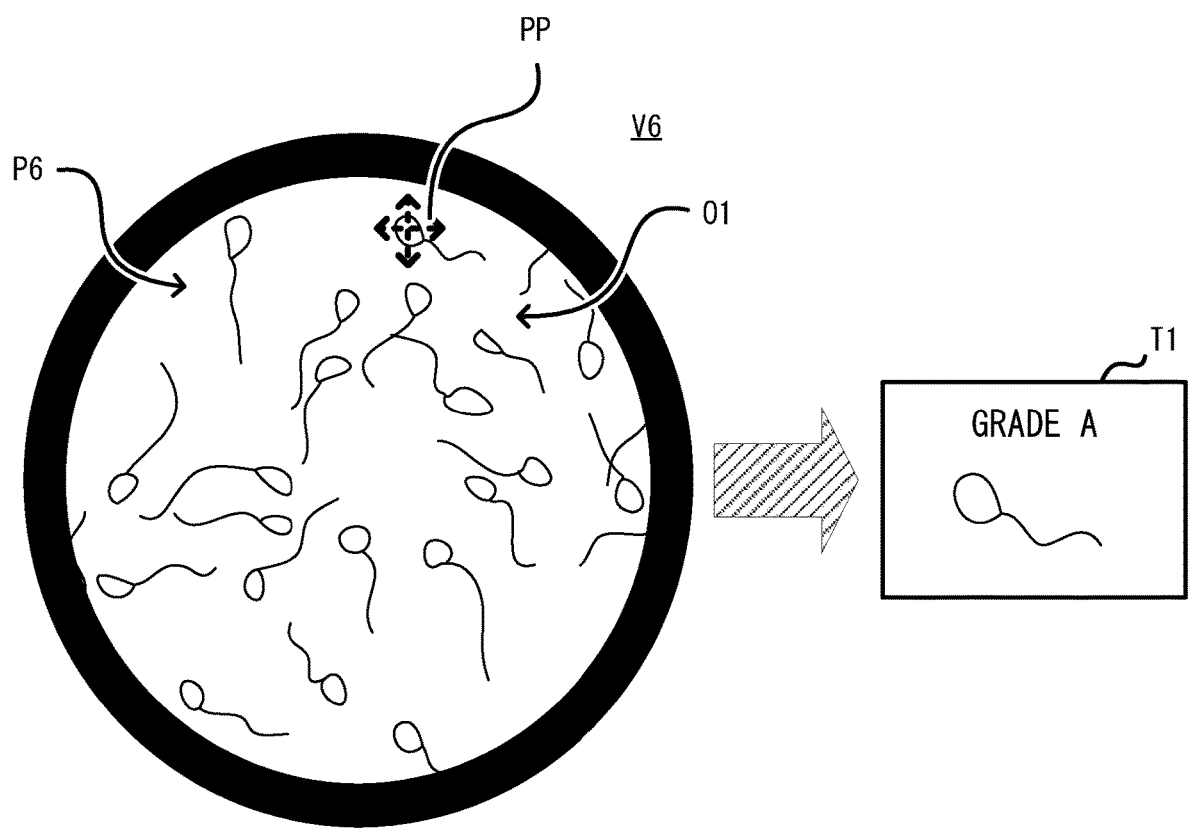
FIG. 19 is a diagram for explaining a method of creating teaching data.

FIG. 19 is a diagram for explaining a method of creating teaching data. FIG. 18 illustrates an example in which the microscope system 1 labels data by having an embryologist evaluate teaching images displayed on the display device 30, but an embryologist may also label images seen using the eyepiece lens 101.

For example, when an experienced embryologist is observing sperm using the eyepiece lens 101 under MC 20× observation, the processing device 20 generates pointer image data corresponding to a pointer image PP that points out a position corresponding to a mouse movement operation (first input operation) performed by the embryologist, and the projection device 153 projects the pointer image PP onto the image plane on the basis of the pointer image data, as illustrated in FIG. 19. An image V6 illustrated in FIG. 19 is obtained by superimposing a projected image P6 onto the optical image O1. The projected image P6 includes the pointer image PP that points out the position corresponding to a mouse movement operation.

Thereafter, when a mouse click operation (second input operation) by the embryologist is detected, the processing device 20 specifies the sperm selected by the embryologist on the basis of the position of the pointer image PP when the mouse click operation is detected. Subsequently, an image T1 of the specified sperm is recorded as a teaching image. Note that at this time, the image T1 may also be labeled according to the content of the second input operation. For example, the image may be labeled as Grade A if the mouse click operation is a left click, as Grade B if the mouse click operation is a left double-click, or as Grade C if the mouse click operation is a right click. With this arrangement, a teaching image can be acquired and labeled at the same time to generate teaching data.

The image quality of images displayed on the display device 30 is degraded compared to the image quality of images observed using the eyepiece lens 101, and therefore it is difficult to distinguish subtle individual differences between sperm from images displayed on the display device 30. In contrast, as illustrated in FIG. 19, by generating teaching data while the embryologist observes sperm using the eyepiece lens 101, sperm can be selected and teaching data can be created while recognizing subtle individual differences between sperm under the same environment as the ICSI work. Consequently, the knowledge of an experienced embryologist with a high fertilization success rate can be converted into teaching data more correctly.

Figure 20:
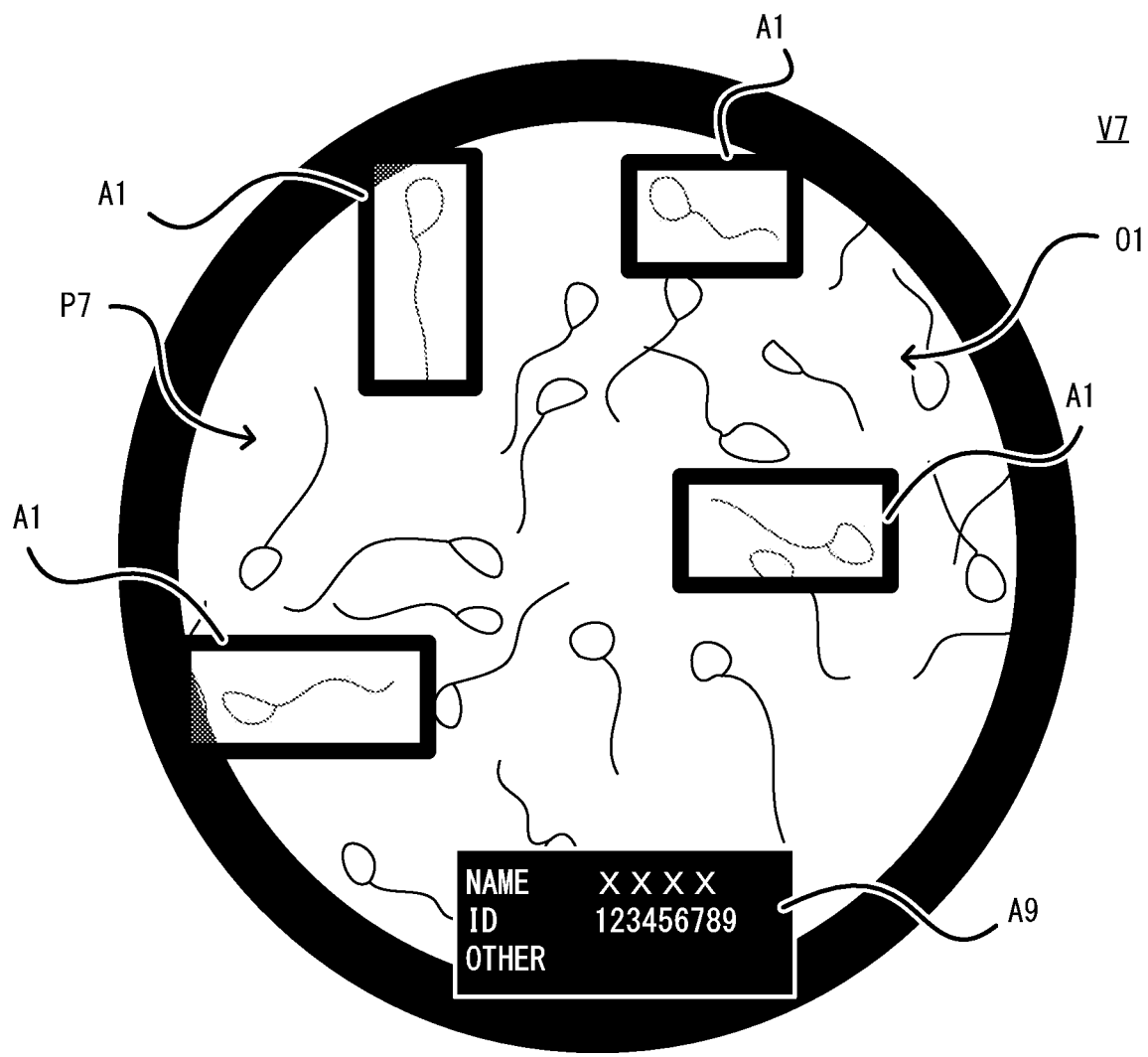
FIG. 20 is a diagram illustrating yet another example of an image seen from the eyepiece lens 101.
Figure 21:
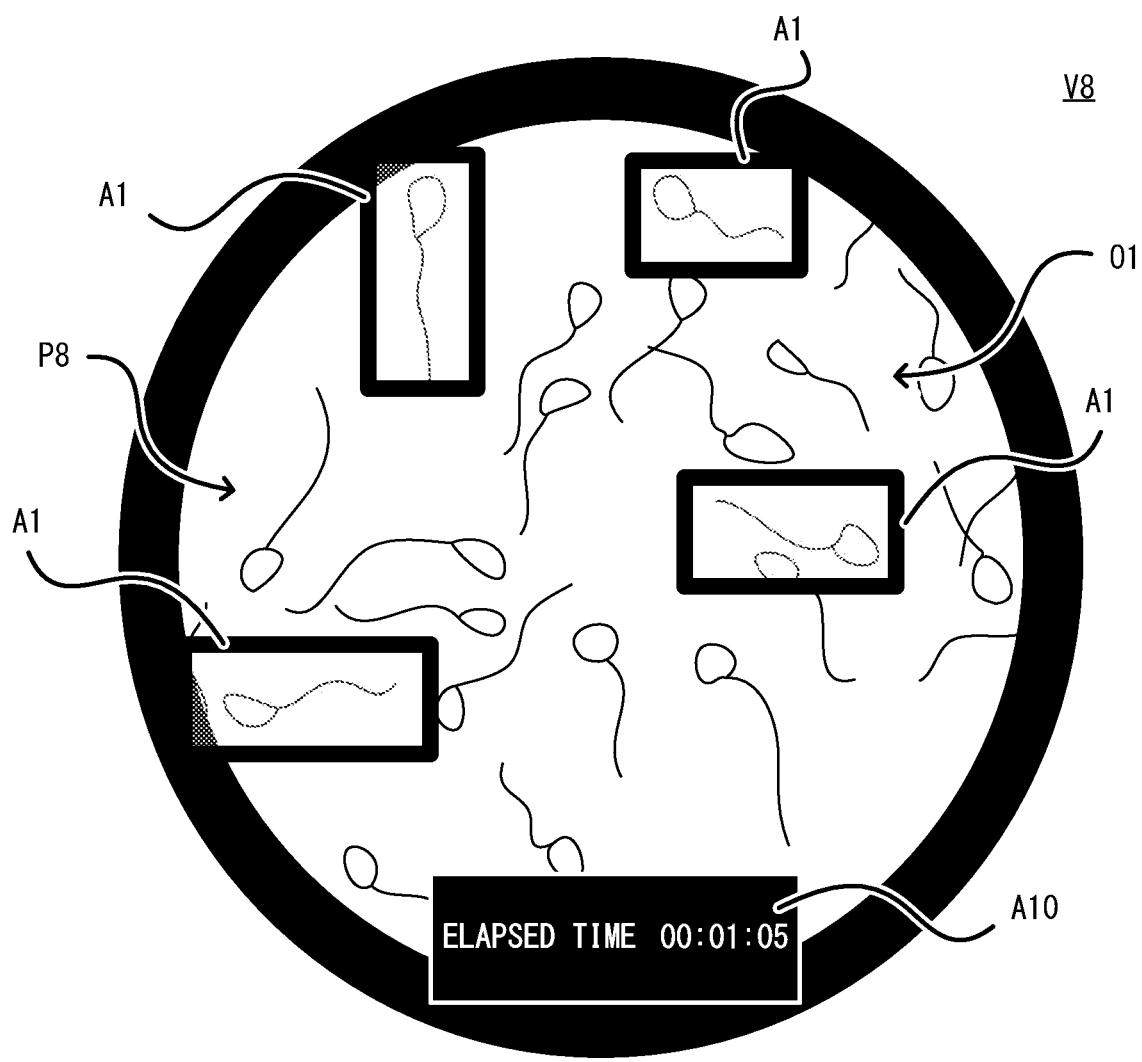
FIG. 21 is a diagram illustrating yet another example of an image seen from the eyepiece lens 101.

FIGS. 20 and 21 are diagrams illustrating still other examples of images seen from the eyepiece lens 101. The above illustrates an example in which the projected image includes an assisting image that specifies candidate sperm, but in addition to the assisting image that specifies candidate sperm, the projected image may also include another assisting image that assists with micro-insemination.

An image V7 illustrated in FIG. 20 is obtained by superimposing a projected image P7 onto the optical image O1. The projected image P7 includes an assisting image A9 indicating information about the patient (one example of a seventh assisting image) in addition to the assisting image A1 that specifies each candidate sperm. In the microscope system 1, the identification device 80 acquires identification information attached to the sample. The processing device 20 acquires information about the patient providing the sample, on the basis of the identification information acquired by the identification device 80. Specifically, for example, the processing device 20 acquires information about the patient providing the sample by extracting information about the patient corresponding to the identification information from the database server 2. Note that the information about the patient includes information such as the name of the patient and an ID, for example. Furthermore, the processing device 20 generates projected image data corresponding to the projected image P7 including the assisting image A1 and the assisting image A9 on the basis of at least the digital image data acquired by the imaging unit 140 and the information about the patient. Finally, the projection device 153 projects the projected image P7 onto the image plane on the basis of the projected image data, thereby causing the image V7 to be formed in the image plane. As illustrated in FIG. 20, by projecting the assisting image A9 indicating information about the patient onto the image plane, the user can perform ICSI while continually confirming the patient acting as the sperm donor.

An image V8 illustrated in FIG. 21 is obtained by superimposing a projected image P8 onto the optical image O1. The projected image P8 includes an assisting image A10 indicating the elapsed time since the processing device 20 detected a predetermined operation (one example of an eighth assisting image) in addition to the assisting image A1 that specifies each candidate sperm. The predetermined operation is an operation of placing a sample on the stage 111, for example. In the microscope system 1, the processing device 20 acquires the elapsed time since a sample was placed on the stage 111. Furthermore, the processing device 20 generates projected image data corresponding to the projected image P8 including the assisting image A1 and the assisting image A10 on the basis of at least the digital image data acquired by the imaging unit 140 and the elapsed time. Finally, the projection device 153 projects the projected image P8 onto the image plane on the basis of the projected image data, thereby causing the image V8 to be formed in the image plane. As illustrated in FIG. 21, by projecting the assisting image A10 indicating the elapsed time onto the image plane, the user can perform ICSI while confirming the elapsed time.

Second Embodiment

Figure 22:
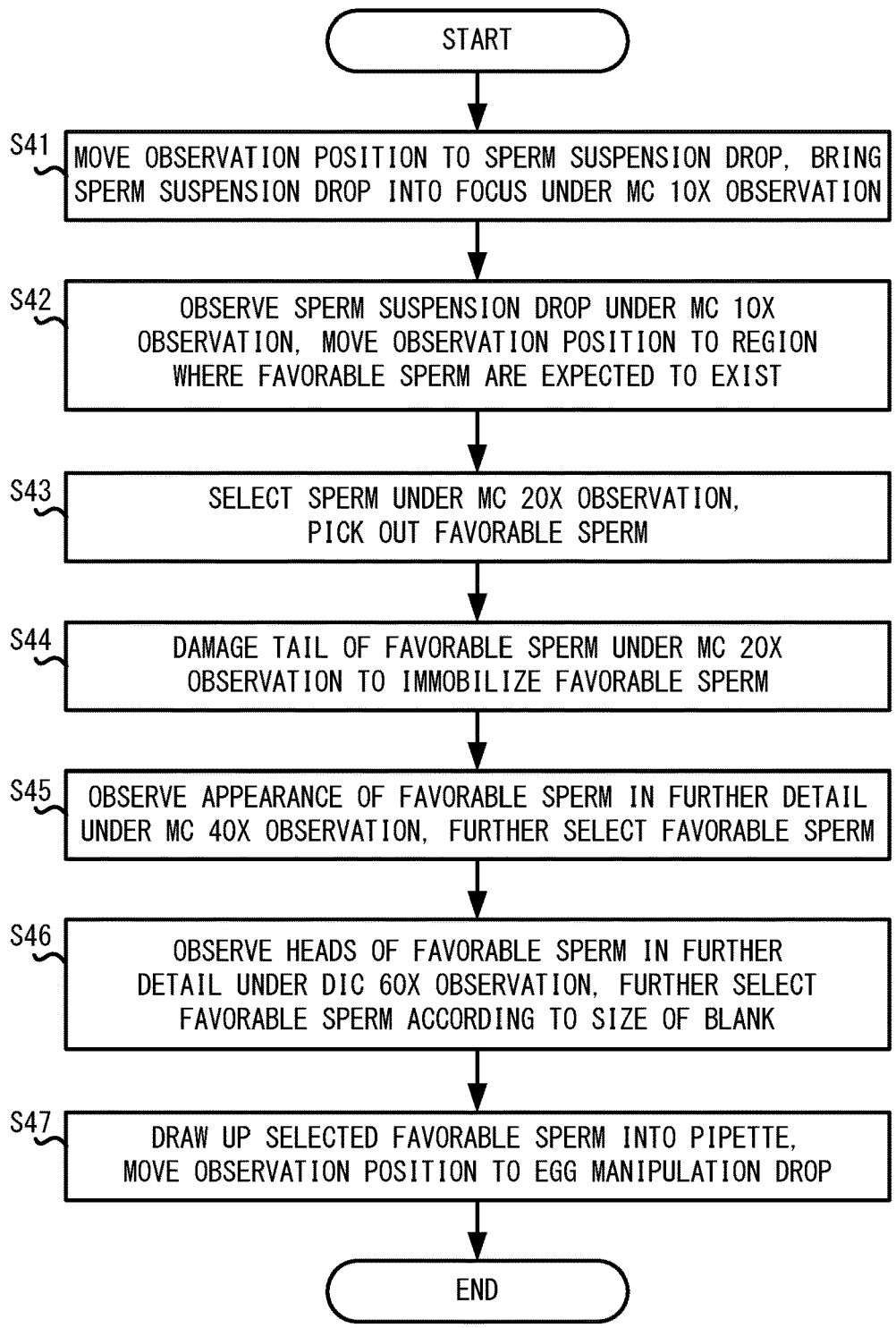
FIG. 22 is a flowchart illustrating another example of a sperm selection procedure.
Figure 23:
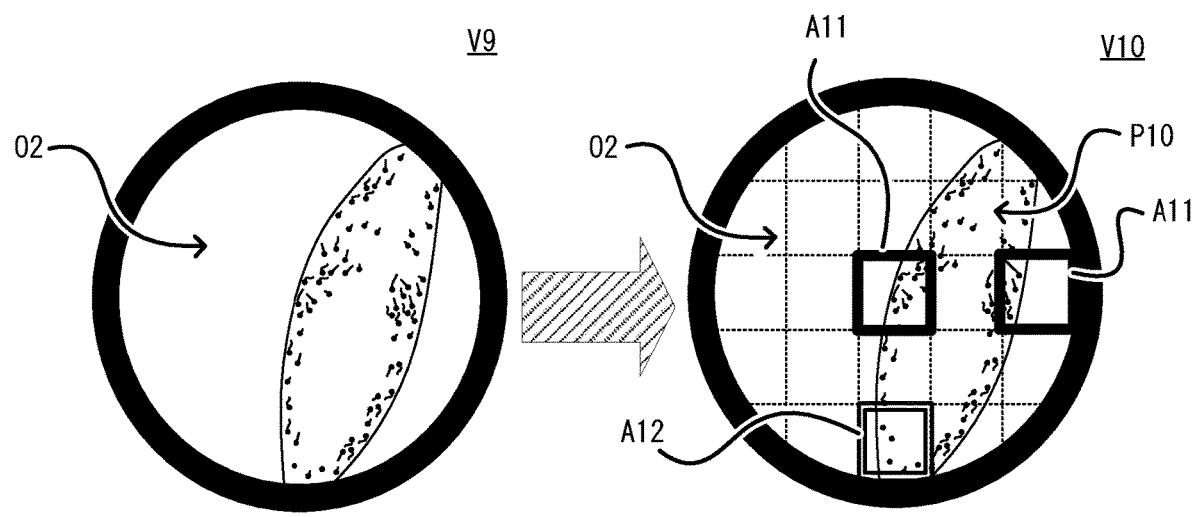
FIG. 23 is a diagram illustrating yet another example of an image seen from the eyepiece lens 101.

FIG. 22 is a flowchart illustrating another example of a sperm selection procedure. FIG. 23 is a diagram illustrating yet another example of an image seen from the eyepiece lens 101. The configuration of the microscope system according to the present embodiment is similar to the configuration of the microscope system 1, and therefore components of the microscope system according to the present embodiment will be referenced by the same signs as the components of the microscope system 1.

The present embodiment differs from the first embodiment in that the sperm selection work in ICSI is performed according to the procedure illustrated in FIG. 22 instead of the procedure illustrated in FIG. 8. Specifically, first, the user presses the button 52 of the input device 50 to switch the settings of the microscope system to MC 10× observation, for example. Next, the user moves the stage 111 to move the observation position to the drops 202 (sperm suspension drops), and bring the drops 202 into focus at MC 10× observation (step S41).

Next, the user observes the drops 202 at MC 10× observation, and moves the stage 111 to move the observation position to a region where favorable sperm are expected to exist. At this point, the microscope system estimates a region where favorable sperm are expected to exist, and assists with the work by the user by notifying the user about the estimated region as a candidate region.

An image V9 illustrated in FIG. 23 is an optical image O2 at MC 10× observation. As illustrated by the image V9, at MC 10× observation, the detailed appearance of the sperm inside one of the drops 202 cannot be confirmed, but the existence of sperm can be confirmed. Accordingly, in step S42, first, the analysis unit 22 divides the sample into a plurality of regions on the basis of the digital image data, treats the region in which the amount of movement by sperm is greater than the amount of movement by sperm inside other regions as a candidate region, and generates an analysis result (second analysis result) that specifies the candidate region. In addition, on the basis of the analysis result generated by the analysis unit 22, the projected image generation unit 23 generates projected image data corresponding to a projected image including an assisting image (second assisting image) that specifies the candidate region. Finally, the projection device 153 notifies the user of the candidate region by projecting the projected image onto the image plane on the basis of the projected image data. An image V10 illustrated in FIG. 23 is obtained by superimposing a projected image P10 onto the optical image O2. The projected image P10 includes an assisting image A11 that specifies each candidate region. Additionally, the projected image P10 also includes an assisting image A12 that specifies a region where the amount of movement by sperm is small.

By causing the image V10 in which the projected image P10 is superimposed onto the optical image O2 to be formed in the image plane, in step S42, the user can specify a region where favorable sperm are expected to exist by referencing the assisting image A11, and move the observation position to the specified region. Consequently, it is possible to avoid wasting time due to moving the observation position to regions where favorable sperm do not exist.

Thereafter, the user can select sperm by performing work according to the procedure from step S43 to step S47. Note that the procedure from step S43 to step S47 is similar to the procedure from step S12 to step S16 illustrated in FIG. 8.

As above, in the microscope system according to the present embodiment in which sperm selection is performed according to the procedure illustrated in FIG. 22, an assisting image that specifies candidate sperm estimated to be favorable sperm is likewise superimposed onto an optical image, thereby making it possible to reduce the burden of the sperm selection work and assist with micro-insemination, similarly to the microscope system 1. Furthermore, according to the microscope system according to the present embodiment, it is possible to avoid moving the observation position to regions where favorable sperm do not exist. Consequently, it is possible to avoid a situation of repeatedly moving the stage 111 to search for favorable sperm.

Note that although the present embodiment illustrates an example of capturing an assisting image that specifies one or more candidate regions at MC 10× observation and projecting an assisting image that specifies candidate sperm at MC 20× observation, these magnifications are merely an example. It is sufficient if the assisting image that specifies one or more candidate regions is captured at a magnification lower than a predetermined magnification factor, and the assisting image that specifies the candidate sperm at a magnification equal to or higher than the predetermined magnification.

For example, when an objective having a magnification equal to or higher than a predetermined magnification in combination with the tube lens 103 is disposed on the optical path by the revolving nosepiece 112, the analysis unit 22 may generate an analysis result that specifies candidate cells, and on the basis of the analysis result, the projected image generation unit 23 may generate projected image data corresponding to a projected image including an assisting image that specifies the candidate cells. Furthermore, when an objective having a magnification lower than a predetermined magnification in combination with the tube lens 103 is disposed on the optical path by the revolving nosepiece 112, the analysis unit 22 may generate an analysis result that specifies a candidate region, and on the basis of the analysis result, the projected image generation unit 23 may generate the projected image data corresponding to a projected image including an assisting image that specifies the candidate region.

Third Embodiment

Figure 24:
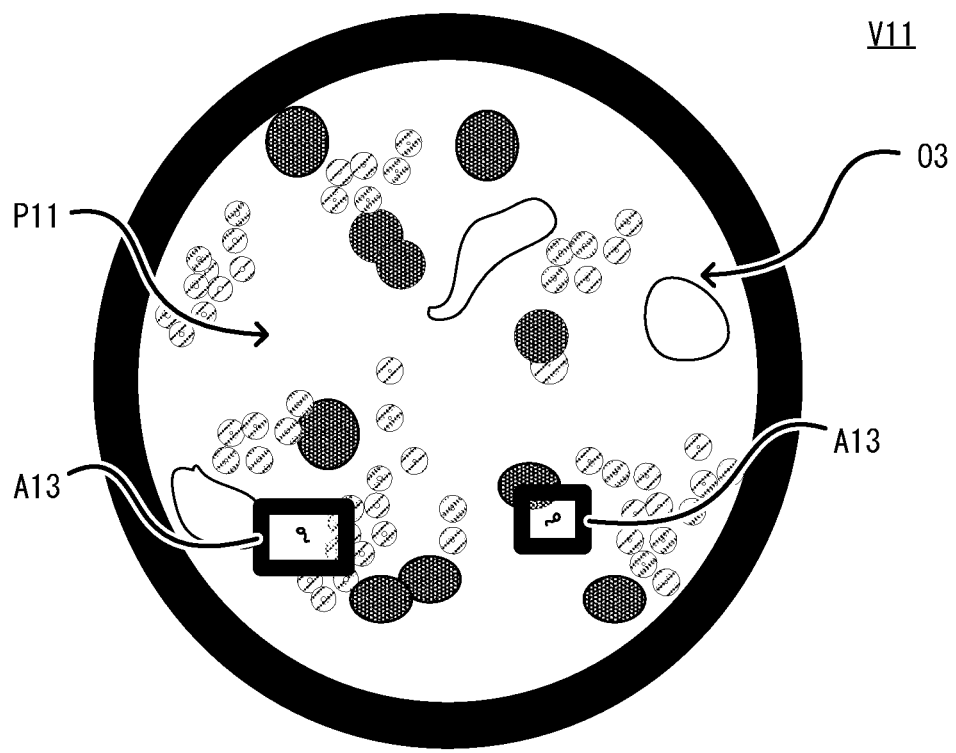
FIG. 24 is a diagram illustrating yet another example of an image seen from the eyepiece lens 101.

FIG. 24 is a diagram illustrating yet another example of an image seen from the eyepiece lens 101. The configuration of the microscope system according to the present embodiment is similar to the configuration of the microscope system 1, and therefore components of the microscope system according to the present embodiment will be referenced by the same signs as the components of the microscope system 1.

In the microscope system 1, an example of performing ICSI using the microscope system is illustrated, but the microscope system according to the present embodiment differs from the microscope system 1 according to the first embodiment in that testicular sperm extraction (TESE) is used.

An image V11 illustrated in FIG. 24 is obtained by superimposing a projected image P11 onto an optical image O3. The optical image O3 is an image of seminiferous tubules inside the testicles, extracted by making an incision in the scrotum. The optical image O3 includes images of various tissues, including red blood cells and white blood cells. The projected image P11 includes an assisting image (fourth assisting image) that specifies reproductive cells, namely sperm.

In the microscope system according to the present embodiment, the analysis unit 22 generates an analysis result that specifies sperm included in the sample on the basis of at least digital image data. Also, on the basis of the analysis result generated by the analysis unit 22, the projected image generation unit 23 generates projected image data including an assisting image that specifies each sperm as an assisting image. Furthermore, the projection device 153 projects the projected image onto the image plane on the basis of the projected image data. With this arrangement, as illustrated in FIG. 24, the projected image P11 including the assisting image A13 is superimposed onto the optical image O3.

Consequently, according to the microscope system according to the present embodiment, sperm mixed in among a variety of tissues can be specified easily in TESE. Consequently, it is possible to greatly reduce the burden of the sperm searching work and assist with micro-insemination, similarly to the microscope system 1.

Fourth Embodiment

Figure 25:
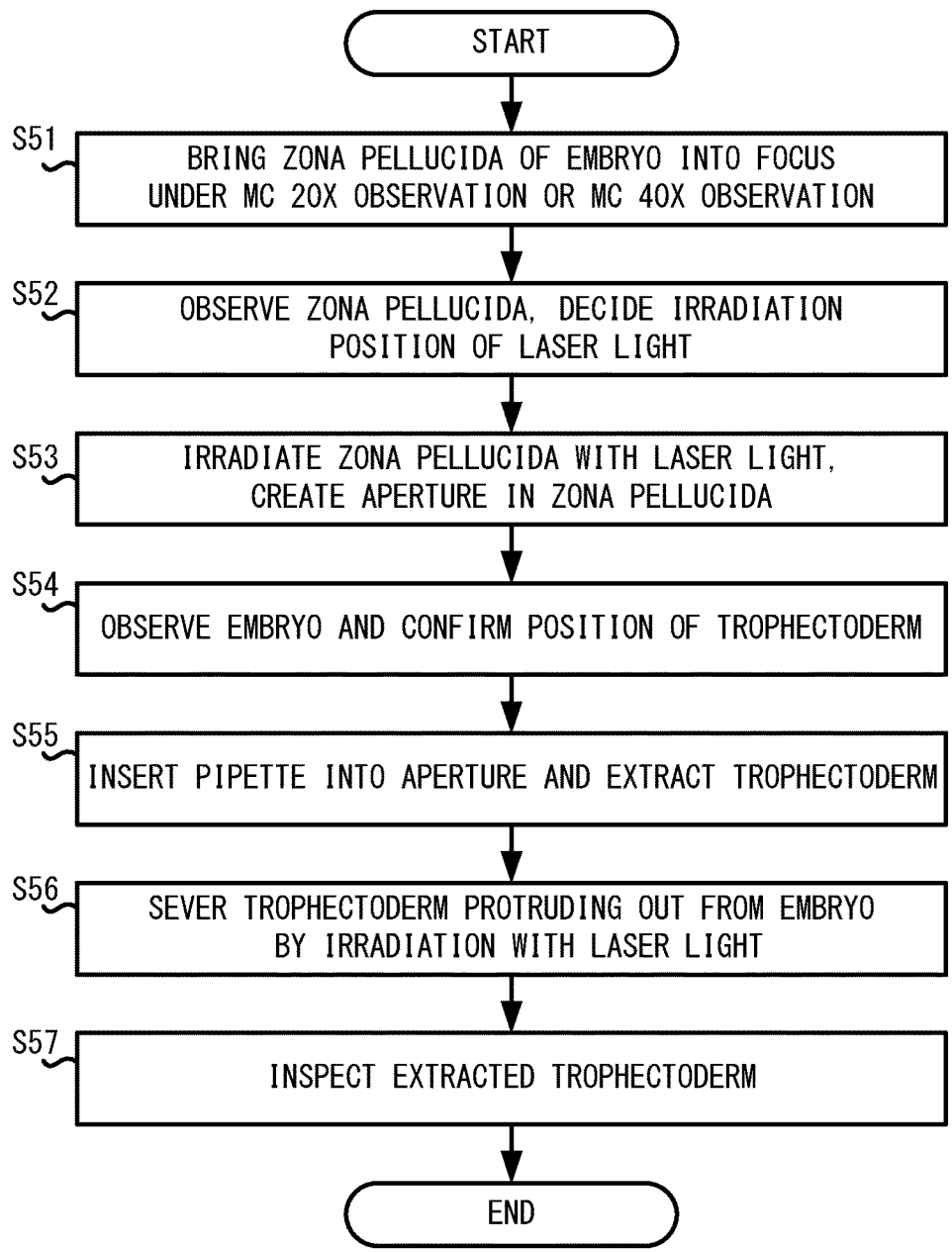
FIG. 25 is a flowchart illustrating an example of a procedure for preimplantation diagnosis.
Figure 26:
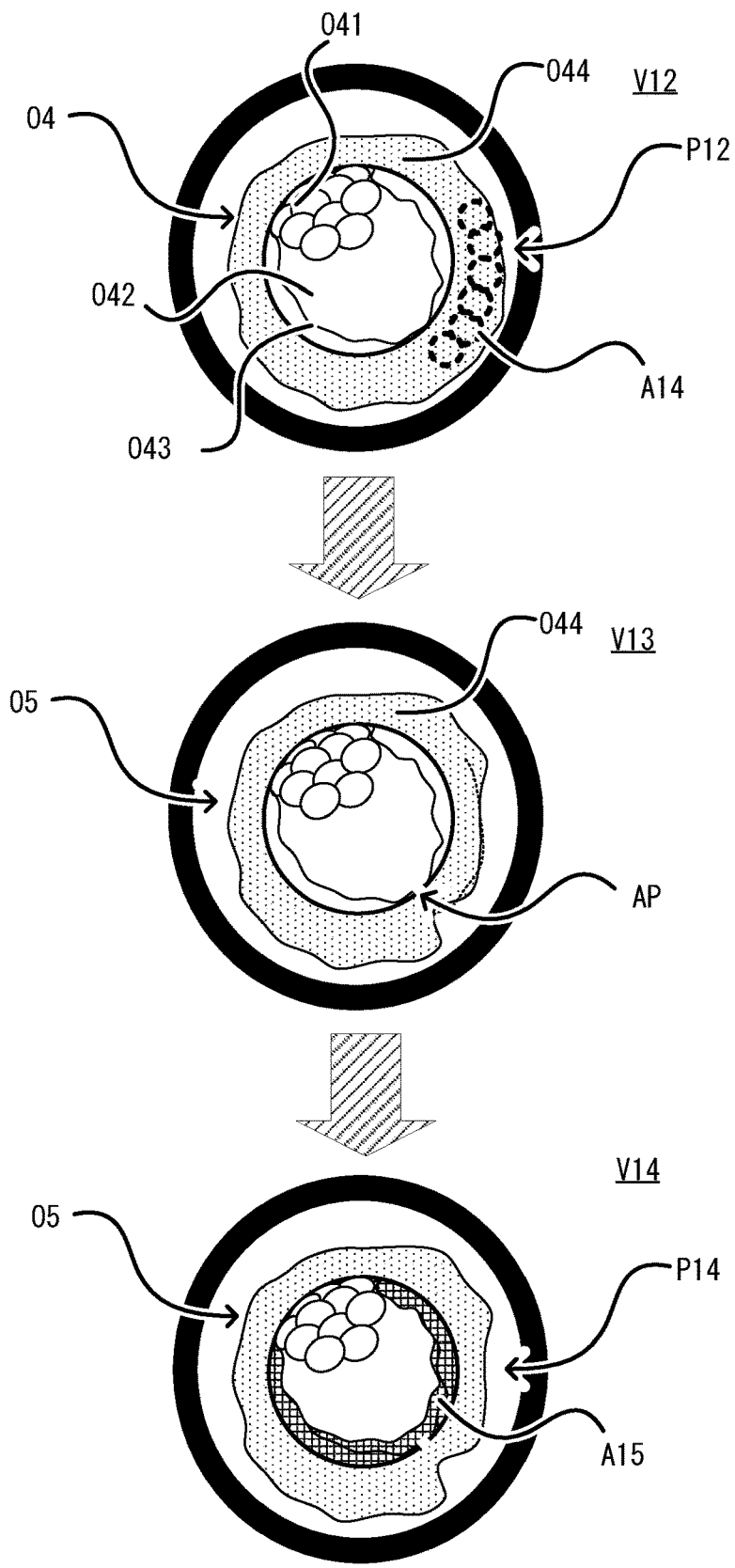
FIG. 26 is a diagram illustrating yet another example of an image seen from the eyepiece lens 101.

FIG. 25 is a flowchart illustrating an example of a procedure for preimplantation diagnosis. FIG. 26 is a diagram illustrating yet another example of an image seen from the eyepiece lens 101. The configuration of the microscope system according to the present embodiment is similar to the configuration of the microscope system 1, and therefore components of the microscope system according to the present embodiment will be referenced by the same signs as the components of the microscope system 1.

In the microscope system 1, an example of performing ICSI using the microscope system is illustrated, but the microscope system according to the present embodiment differs from the microscope system 1 according to the first embodiment by being used for laser-assisted hatching for assisting with the implantation of an embryo (blastocyst) developed from a fertilized egg and also for the extraction of trophectoderm cells for preimplantation diagnosis. Note that in this example, the sample includes an embryo developed from a fertilized egg and the zona pellucida surrounding the embryo.

Specifically, first, the user presses the button 53 or the button 54 of the input device 50 to switch the settings of the microscope system to MC 20× observation or MC 40× observation, for example. Additionally, the user moves the stage 111 to bring the zona pellucida surrounding the embryo into focus (step S51).

Next, the user observes the zona pellucida, and decides a position for laser irradiation by the laser-assisted hatching unit 130 (step S52). In the case where the zona pellucida has a qualitative abnormality, such as being thick or hard, the embryo will be unable to pierce the zona pellucida and become implanted in the endometrium. To avoid such situations, laser-assisted hatching removes the zona pellucida to assist with implantation. In step S52, it is necessary to decide the position to be irradiated with laser light appropriately to remove the zona pellucida without injuring the embryo.

Accordingly, in step S52, the microscope system calculates an appropriate irradiation position by image analysis and notifies the user. Specifically, the analysis unit 22 generates an analysis result that specifies a candidate spot suitable for irradiation with laser light in the zona pellucida, on the basis of at least digital image data acquired by the imaging unit 140. In addition, on the basis of the analysis result generated by the analysis unit 22, the projected image generation unit 23 generates projected image data corresponding to a projected image including an assisting image (fifth assisting image) that specifies the candidate spot as an assisting image that generates projected image data. Furthermore, the projection device 153 projects the projected image onto the image plane on the basis of the projected image data generated by the projected image generation unit 23, and superimposes the projected image onto an optical image of the sample. An image V12 illustrated in FIG. 26 is obtained by superimposing a projected image P12 onto an optical image O4. The optical image O4 includes an image of an embryo (inner cell mass O41, blastocoel O42, and trophectoderm O43) and an image of a zona pellucida O44 surrounding the embryo. The projected image P12 includes an assisting image A14 that specifies a candidate spot suitable for irradiation with laser light.

By causing the image V12 in which the projected image P12 is superimposed onto the optical image O4 to be formed in the image plane, in step S52, the user can refer to the position of the assisting image A14 to decide and set the position for laser irradiation in the laser-assisted hatching unit 130. Consequently, an appropriate position for laser irradiation can be set easily.

When the position for laser irradiation is decided, the user uses the laser-assisted hatching unit 130 to irradiate the position decided step S52 in the zona pellucida with laser light and create an aperture in the zona pellucida (step S53). An image V13 illustrated in FIG. 26 is an optical image O5 of the sample after irradiation with laser light, and illustrates a state after an aperture AP has been formed in the zona pellucida O44 by irradiation with laser light.

Thereafter, the user observes the embryo and confirms the position of the trophectoderm (step S54). At this point, the microscope system specifies the position of the trophectoderm O43 by image analysis and notifies the user. Specifically, the analysis unit 22 generates an analysis result that specifies the trophectoderm O43 inside the embryo on the basis of at least digital image data acquired by the imaging unit 140. In addition, on the basis of the analysis result generated by the analysis unit 22, the projected image generation unit 23 generates projected image data corresponding to a projected image including an assisting image (sixth assisting image) that specifies the trophectoderm as an assisting image. Furthermore, the projection device 153 projects the projected image onto the image plane on the basis of the projected image data generated by the projected image generation unit 23, and superimposes the projected image onto an optical image of the sample. An image V14 illustrated in FIG. 26 is obtained by superimposing a projected image P14 onto an optical image O5. The projected image P14 includes an assisting image A15 that specifies the trophectoderm O43.

By causing the image V14 in which the projected image P14 is superimposed onto the optical image O5 to be formed in the image plane, in step S54, the user can easily confirm the position of the trophectoderm with the assisting image A15.

Thereafter, the user inserts a pipette into the aperture AP and extracts the trophectoderm O43 (step S55). At this point, negative pressure is applied to the inserted pipette to suction the trophectoderm O43 at the position confirmed in step S54.

Because the trophectoderm is highly viscous, the trophectoderm protrudes out from the embryo after pulling the pipette out from the aperture AP. For this reason, the user uses the laser-assisted hatching unit 130 again to sever the trophectoderm protruding out by irradiating the space between the pipette and the embryo with laser light (step S56).

Thereafter, the user inspects the extracted trophectoderm inside the pipette (step S57). At this point, several cells of the extracted trophectoderm are used to make a preimplantation diagnosis.

As above, in the microscope system according to the present embodiment in which laser-assisted hatching and trophectoderm extraction are performed according to the procedure illustrated in FIG. 25, it is likewise possible to assist with the work by the embryologist for micro-insemination. Consequently, it is possible to assist with microinsemination similarly to the microscope system according to the embodiments described above.

Note that like the other embodiments, the analysis unit 22 according to the present embodiment may also adopt a rule-based algorithm or a trained model constructed by machine learning.

The embodiments described above illustrate specific examples for facilitating the understanding of the invention, and embodiments of the present invention are not limited thereto. Various modifications and alterations of a microscope system are possible without departing from the scope of the claims.

For example, FIG. 12 illustrates an example of projecting the assisting image A1 that specifies each candidate sperm together with the assisting image A2 that indicates the trail of movement by each candidate sperm, but it is also possible to superimpose only an assisting image (third assisting image) that indicates the trail of movement by each candidate sperm onto the optical image. Also, the analysis unit 22 may specify a trail of movement by a reproductive cell included in the sample on the basis of digital image data, and on the basis of the analysis result, the projected image generation unit 23 may generate projected image data corresponding to a projected image including an assisting image that indicates the trail of movement by the reproductive cell as an assisting image. In other words, in addition to the assisting image that indicates the trail of movement by each candidate sperm, an assisting image that indicates a trail of movement by sperm other than the candidate sperm may also be projected.

Additionally, the embodiments described above illustrate an example of a microscope system that observes a sample according to the four microscopy methods of bright field (BF) observation, polarized (PO) observation, differential interference contrast (DIC) observation, and modulation contrast (MC) observation, but the sample may also be observed according to another microscopy method such as phase-contrast (PC) observation in addition to the above. In the case where the microscope system performs phase-contrast observation, a phase-contrast objective is included.

Figure 27:
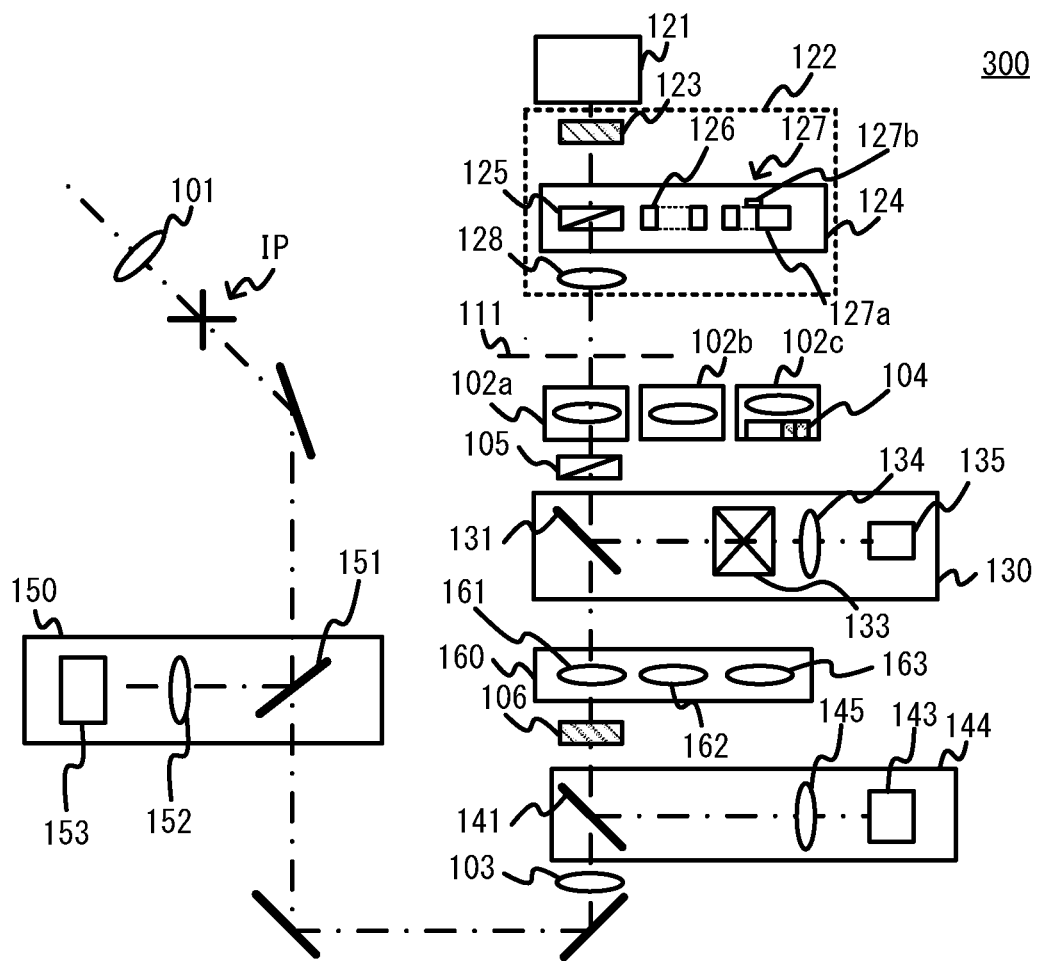
FIG. 27 is a diagram illustrating an example of a configuration of an inverted microscope 300.

FIG. 27 is a diagram illustrating an example of a configuration of an inverted microscope 300. The microscope system 1 may include the inverted microscope 300 instead of the inverted microscope 100. The inverted microscope 300 differs from the inverted microscope 100 in that an imaging unit 144 is included instead of the imaging unit 140, and the tube lens 103 is positioned between the imaging unit 144 and the eyepiece lens 101. Note that the imaging unit 144 includes a lens 145 for condensing light incident without passing through the tube lens 103 onto the imaging element 143. Even in the case of including the inverted microscope 300, the microscope system 1 is capable of obtaining effects similar to the case of including the inverted microscope 100.

Figure 28:
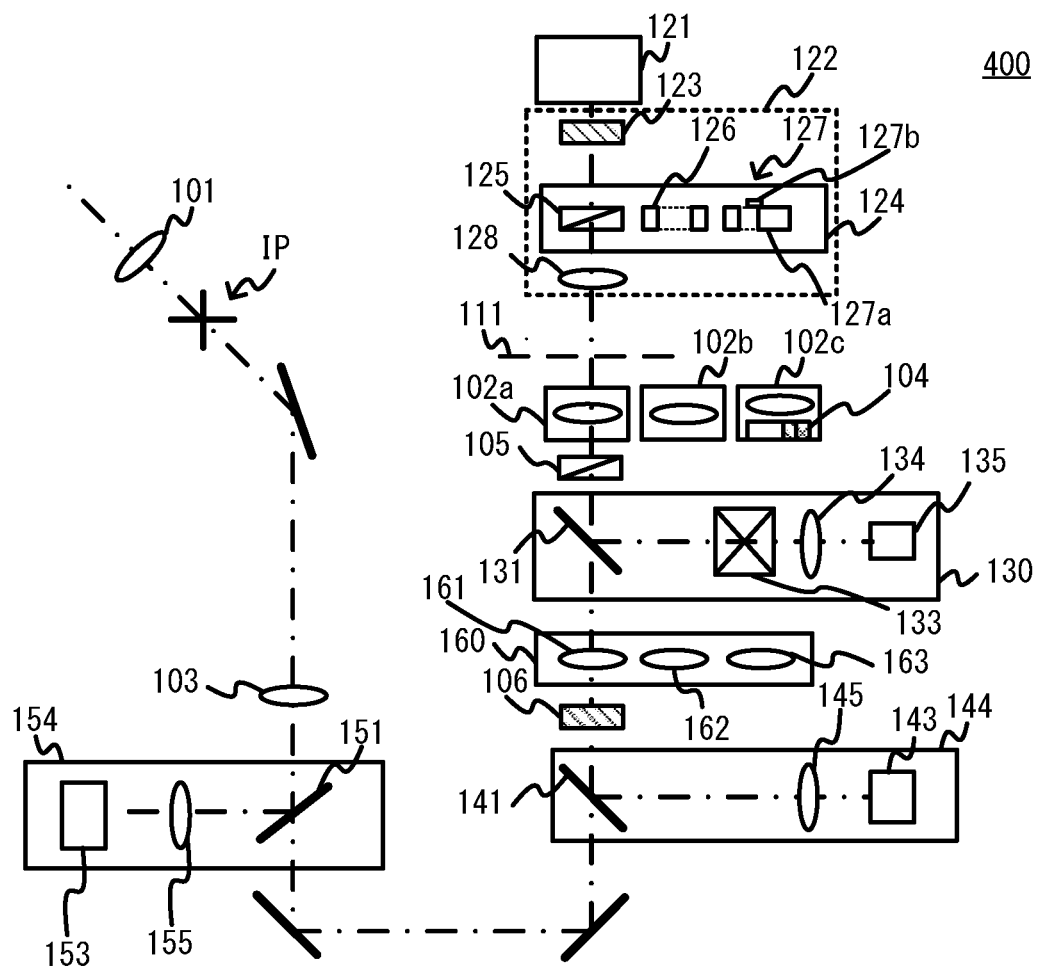
FIG. 28 is a diagram illustrating an example of a configuration of an inverted microscope 400.

FIG. 28 is a diagram illustrating an example of a configuration of an inverted microscope 400. The microscope system 1 may include the inverted microscope 400 instead of the inverted microscope 100. The inverted microscope 400 differs from the inverted microscope 100 in that the imaging unit 144 is included instead of the imaging unit 140, a projection unit 154 is included instead of the projection unit 150, and the tube lens 103 is positioned between the projection unit 154 and the eyepiece lens 101. Note that the imaging unit 144 includes a lens 145 for condensing light incident without passing through the tube lens 103 onto the imaging element 143. The projection unit 154 includes a lens 155 having a different focal length than the lens 152, so as to condense light onto the image plane IP through the tube lens 103. Even in the case of including the inverted microscope 400, the microscope system 1 is capable of obtaining effects similar to the case of including the inverted microscope 100.

What is claimed is:

1. An inverted microscope system provided with a transillumination subsystem that illuminates a sample, the inverted microscope system comprising:
   an eyepiece lens;
   an objective that guides transmitted light transmitted through the sample to the eyepiece lens;
   a tube lens, disposed between the eyepiece lens and the objective, that forms an optical image of the sample on a basis of the transmitted light;
   an imaging device that acquires digital image data of the sample on a basis of the transmitted light;
   a projection device, disposed below the objective, that projects a projected image on a basis of projected image data onto an image plane where the optical image is formed;
   a first modulation element, included in the transillumination subsystem, that modulates illuminating light irradiating the sample;
   a second modulation element, disposed between the objective and the tube lens, that modulates the transmitted light; and
   a processor and a memory, the processor being configured to perform the following steps:
      generating an analysis result that specifies a candidate cell, that is, a reproductive cell suitable for fertilization from among reproductive cells included in the sample, on a basis of at least the digital image data acquired by the imaging device; and
      generating the projected image data on a basis of the generated analysis result, wherein
   the projected image includes a first assisting image that specifies the candidate cell as an assisting image that assists with micro-insemination using the sample.

2. The inverted microscope system according to claim 1, wherein
   the projected image includes the first assisting image at a position in the projected image that does not overlap with an image of the candidate cell included in the optical image when the projected image is projected onto the image plane.

3. The inverted microscope system according to claim 1, wherein
   the first assisting image has a shape that surrounds the image of the candidate cell or a shape that points out the image of the candidate cell.

4. The inverted microscope system according to claim 1, wherein
   the first assisting image has an appearance according to a degree of recommendation of the candidate cell specified by the first assisting image.

5. The inverted microscope system according to claim 4, wherein
   the first assisting image has a color according to a degree of recommendation of the candidate cell specified by the first assisting image.

6. The inverted microscope system according to claim 1, wherein
   the processor is configured to analyze the reproductive cell on a basis of at least one of an appearance of the reproductive cell or a motility of the reproductive cell.

7. The inverted microscope system according to claim 1, further comprising:
   a switching device on which a plurality of objectives including the objective are installed, the switching device switching the objective disposed on an optical path from among the plurality of objectives, wherein
   the processor is configured to
   in a case where an objective having a magnification equal to or higher than a predetermined magnification in combination with the tube lens is disposed on the optical path by the switching device,
      generate the analysis result that specifies the candidate cell, and
      generate the projected image data corresponding to the projected image including the first assisting image as the assisting image on a basis of the analysis result, and
   in a case where an objective having a magnification lower than the predetermined magnification in combination with the tube lens is disposed on the optical path by the switching device,
      generate a second analysis result that specifies a candidate region, the candidate region being a region of the sample in which an amount of movement by reproductive cells inside the candidate region is greater than the amount of movement by reproductive cells inside other regions of the sample, and
      generate the projected image data corresponding to the projected image including a second assisting image as the assisting image on a basis of the second analysis result, the second assisting image being an image that specifies the candidate region.

8. The inverted microscope system according to claim 1, wherein
   the processor is configured to use a trained neural network to at least analyze the digital image data, and
   the trained neural network is a neural network that has been trained using image data corresponding to images of reproductive cells labeled as suitable or unsuitable for fertilization as teaching data.

9. The inverted microscope system according to claim 1, wherein
   the processor is configured to
      generate pointer image data corresponding to a pointer image that points out a position according to a first input operation by a user, and
      record an image of a target object included in the sample as a teaching image, the target object being specified on a basis of the position of the pointer image when a second input operation by the user is detected, and
   the projection device projects the pointer image onto the image plane on a basis of the pointer image data.

10. The inverted microscope system according to claim 1, wherein
the sample includes sperm,
the processor is configured to generate the projected image data on a basis of the digital image data and other data, and
the other data includes at least one of data about a culture fluid in which the sample is cultivated, clinical data about a mother, or an examination result regarding semen containing the sperm.

11. The inverted microscope system according to claim 1, further comprising:
an identification device that acquires identification information attached to the sample, wherein
the processor is configured to
acquire information about a patient providing the sample on a basis of the identification information acquired by the identification device, and
generate the projected image data on a basis of at least the digital image data and the information about the patient, the projected image including a seventh assisting image that indicates the information about the patient as the assisting image.

12. The inverted microscope system according to claim 1, wherein
the processor is configured to
acquire an elapsed time since a predetermined operation was detected, and
generate the projected image data on a basis of at least the digital image data and the elapsed time, the projected image including an eighth assisting image that indicates the elapsed time as the assisting image.

13. The inverted microscope system according to claim 1, further comprising:
an intermediate magnification change unit, disposed between the objective and the tube lens, that changes a magnification of the optical image.

14. The inverted microscope system according to claim 1, wherein
the first modulation element includes a first polarizing plate, a light-shielding plate having a slit formed therein, and a second polarizing plate that covers a portion of the slit, and
the second modulation element includes a modulator having three zones with different degrees of transmittance.

15. The inverted microscope system according to claim 1, wherein
the first modulation element includes a polarizer, and
the second modulation element includes an analyzer.

16. The inverted microscope system according to claim 1, wherein
the image plane is formed between the tube lens and the eyepiece lens.

* * * * *